(12) United States Patent
Isobe et al.

(10) Patent No.: US 12,530,873 B2
(45) Date of Patent: Jan. 20, 2026

(54) TRAINING METHOD

(71) Applicant: Panasonic Intellectual Property Management Co., Ltd., Osaka (JP)

(72) Inventors: Shota Isobe, Kyoto (JP); Yutaka Yoshihama, Osaka (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 430 days.

(21) Appl. No.: 18/162,498

(22) Filed: Jan. 31, 2023

(65) Prior Publication Data

US 2023/0274533 A1     Aug. 31, 2023

(30) Foreign Application Priority Data

Feb. 28, 2022   (JP) .................................. 2022-029757

(51) Int. Cl.
*G06V 10/774* (2022.01)
*G06V 10/764* (2022.01)
(Continued)

(52) U.S. Cl.
CPC .......... *G06V 10/774* (2022.01); *G06V 10/764* (2022.01); *G06V 10/776* (2022.01); *G06V 10/82* (2022.01)

(58) Field of Classification Search
CPC .. G06V 10/774; G06V 10/764; G06V 10/776; G06V 10/82; G06V 10/454
See application file for complete search history.

(56) References Cited

U.S. PATENT DOCUMENTS 12,314,861 B2 * 5/2025 Li ...................... G06F 18/2415
2017/0228641 A1   8/2017 Sohn
(Continued)

FOREIGN PATENT DOCUMENTS

JP   2019509551 A   4/2019
JP   2020047055 A   3/2020
(Continued)

OTHER PUBLICATIONS

Wang, Peng, et al. "Contrastive learning based hybrid networks for long-tailed image classification." Proceedings of the IEEE/CVF conference on computer vision and pattern recognition. 2021. (Year: 2021).*

(Continued)

*Primary Examiner* — Ross Varndell
(74) *Attorney, Agent, or Firm* — Seed Intellectual Property Law Group LLP

(57) ABSTRACT

A training method according to the present disclosure is a training method performed by a computer to train a neural network model including a first network branch for representation learning with use of supervised contrastive learning, and a second network branch for training of computer vision tasks including a classification task and a task other than the classification task. The training method includes: performing label processing for converting labels of M image data items into labels applicable to the representation learning, as labels of the computer vision tasks; and training an encoder network model and a first model with use of a first loss function for use in the supervised contrastive learning, the labels of the M image data items on which the label processing has been performed, and embedding vectors of the M image data items.

6 Claims, 25 Drawing Sheets

(51) Int. Cl.
*G06V 10/776* (2022.01)
*G06V 10/82* (2022.01)

(56) References Cited

U.S. PATENT DOCUMENTS

| | | | |
|---|---|---|---|
| 2018/0336683 A1* | 11/2018 | Feng | G06T 7/12 |
| 2019/0025848 A1* | 1/2019 | Kolouri | G05D 1/0246 |
| 2021/0357698 A1 | 11/2021 | Murasaki et al. | |
| 2022/0164600 A1* | 5/2022 | Cheng | G06V 30/19147 |
| 2022/0269946 A1* | 8/2022 | Zhou | G06N 3/084 |
| 2023/0153629 A1* | 5/2023 | Krishnan | G06V 10/454 |
| | | | 382/155 |
| 2023/0169332 A1* | 6/2023 | Karthik | G06N 3/045 |
| | | | 706/25 |

FOREIGN PATENT DOCUMENTS

| | | | | |
|---|---|---|---|---|
| WO | WO 2017136060 A1 | 8/2017 | | |
| WO | WO-2018015080 A1 * | 1/2018 | | G06N 3/045 |
| WO | WO-2021216310 A1 * | 10/2021 | | G06N 3/045 |

OTHER PUBLICATIONS

Gunel et al., "Supervised Contrastive Learning for Pre-Trained Language Model Fine-Tuning," International Conference on Learning Representations, Vienna, Austria, May 4, 2021. (15 pages).
Wang et al., "Contrastive Learning based Hybrid Networks for Long-Tailed Image Classification," 2021 IEEE/CVF Conference on Computer Vision and Pattern Recognition (CVPR), Nashville, TN, USA, Jun. 20-25, 2021, pp. 943-952.

* cited by examiner $(z_i) = \text{Proj}(\text{Enc}(\tilde{x}_i))$

Embedding vector $(z_{t(i)}) = \text{Proj}(\text{Enc}(\tilde{x}_{t(i)}))$

Embedding vector (c)                         (d)
Representation conversion (Class count, )

Object detection task

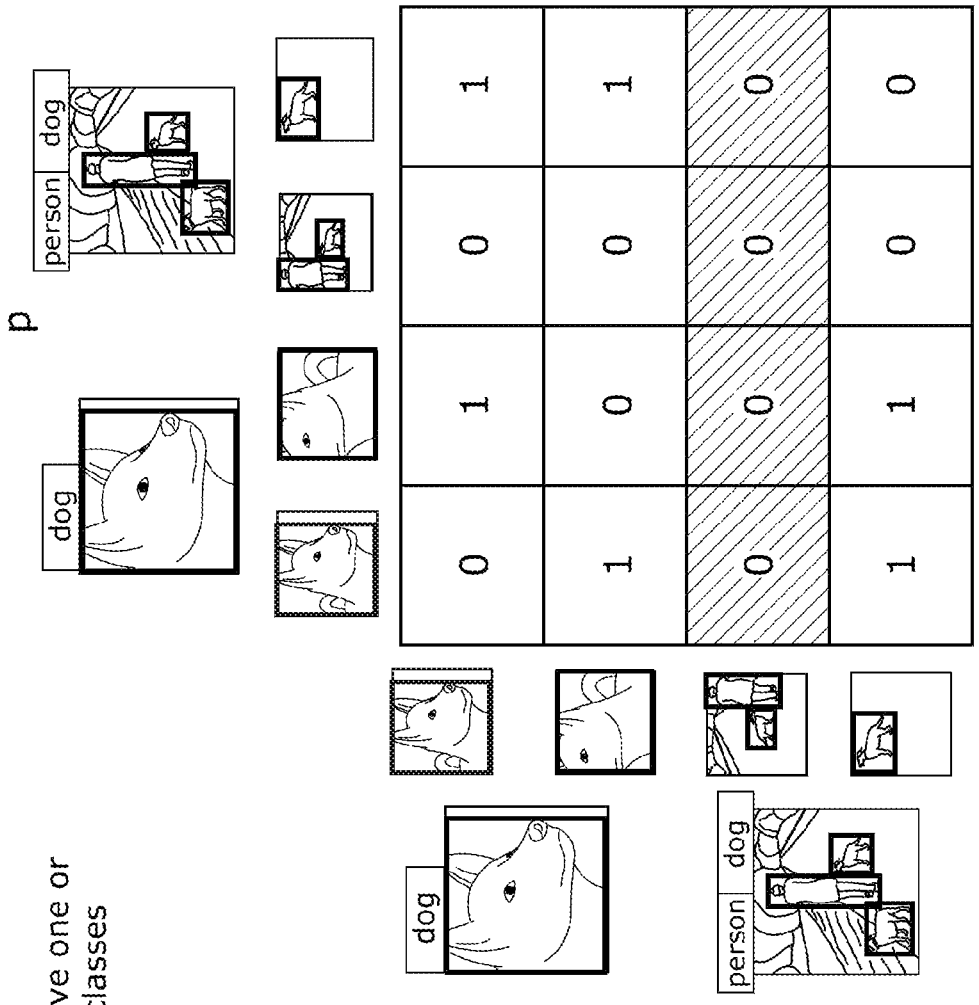

FIG. 17B

When labels have one or more types of classes (a)
p
| 0 | 1 | 1 | 1 |
|---|---|---|---|
| 1 | 1 | 0 | 1 |
| 1 | 1 | 0 | 1 |
| 1 | 1 | 1 | 0 | i
A(i)

⊙

(b)
p
| 1 | 1 | 0 | 1 |
|---|---|---|---|
| 1 | 1 | 0 | 1 |
| 1 | 0 | 0 | 1 |
| 1 | 1 | 0 | 1 |

$\tilde{y}_p = \tilde{y}_i$

=

(c)
p
| 0 | 1 | 0 | 0 |
|---|---|---|---|
| 1 | 0 | 0 | 1 |
| 0 | 0 | 0 | 0 |
| 1 | 1 | 0 | 0 |

When labels have one or more types of classes

FIG. 17D

When labels have one or more types of classes (a) $A(i), \tilde{y}_p = \tilde{y}_i$

+

(b) $t(i) = p$

=

(c)

TRAINING METHOD

CROSS REFERENCE TO RELATED APPLICATION

The present application is based on and claims priority of Japanese Patent Application No. 2022-029757 filed on Feb. 28, 2022.

FIELD

The present disclosure relates to a training method for training a neural network model.

BACKGROUND

Non Patent Literature (NPL) 1 discloses a method for training a hybrid network structure, utilizing a supervised contrastive loss for learning image representations and a cross-entropy loss to learn classifiers. NPT 1 also discloses that classification accuracy can be stably improved by training the structure using a supervised contrastive loss for learning image representations and a cross-entropy loss to learn classifiers, even if a data set that includes data items whose data counts differ for labels.

CITATION LIST

Non Patent Literature

NPL 1: Peng Wang et al. "Contrastive Learning based Hybrid Networks for Long-Tailed Image Classification", CVPR, 2021.

SUMMARY

However, there are ways to improve the above-stated training method according to NPT 1.

In view of this, the present disclosure provides a training method with which further improvements can be made.

In order to provide an improved method, a training method according to an aspect of the present disclosure is a training method performed by a computer to train a neural network model that includes a first network branch for representation learning with use of supervised contrastive learning, and a second network branch for training of computer vision tasks that include a classification task and a task other than the classification task, the neural network model including: an encoder network model shared by the first network branch and the second network branch; a first model included in only the first network branch; and a second model included in only the second network branch, the training method including: obtaining N image data that is one or more image data items and one or more labels in one-to-one association with the N image data from a data set that includes one or more preprovided image data items and one or more preprovided labels, N denoting an integer greater than or equal to 1; performing data augmentation processing on the N image data obtained and the one or more labels obtained, which are in one-to-one association with the N image data, to obtain M image data items and labels in one-to-one association with the M image data items, M denoting an integer multiple of N; extracting, by the encoder network model, feature representations of the M image data items from the M image data items; projecting, by the first model, the feature representations of the M image data items that are extracted, onto embedding vectors for use in the supervised contrastive learning; performing label processing for converting the labels of the M image data items into labels applicable to the representation learning, as labels of the computer vision tasks; training the encoder network model and the first model with use of a first loss function for use in the supervised contrastive learning, the labels of the M image data items on which the label processing has been performed, and the embedding vectors of the M image data items; obtaining the M image data items resulting from the data augmentation processing; extracting, by the encoder network model, feature representations of the M image data items from the M image data items obtained; inferring, by the second model, labels of the M image data items from the feature representations of the M image data items that are extracted; and training the encoder network model and the second model with use of a second loss function for use in the training, the labels of the M image data items that are inferred, and the labels of the M image data items. The training of the encoder network model and the first model and the training of the encoder network model and the second model are simultaneously performed.

Note that these general and specific aspects may be implemented using a device, a method, an integrated circuit, a computer program, a computer-readable recording medium such as a compact disc read only memory (CD-ROM), or any combination of systems, methods, integrated circuits, computer programs or recording media.

The training method according to an aspect of the present disclosure can yield further improvements.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 17A illustrates other examples of results of label processing when labels have one or more types of classes, according to the embodiment.

FIG. 17B conceptually illustrates a first loss calculation that produces results illustrated in FIG. 17A.

FIG. 17D conceptually illustrates the changed first loss calculation used to obtain results illustrated in FIG. 17C.

Figure 1:
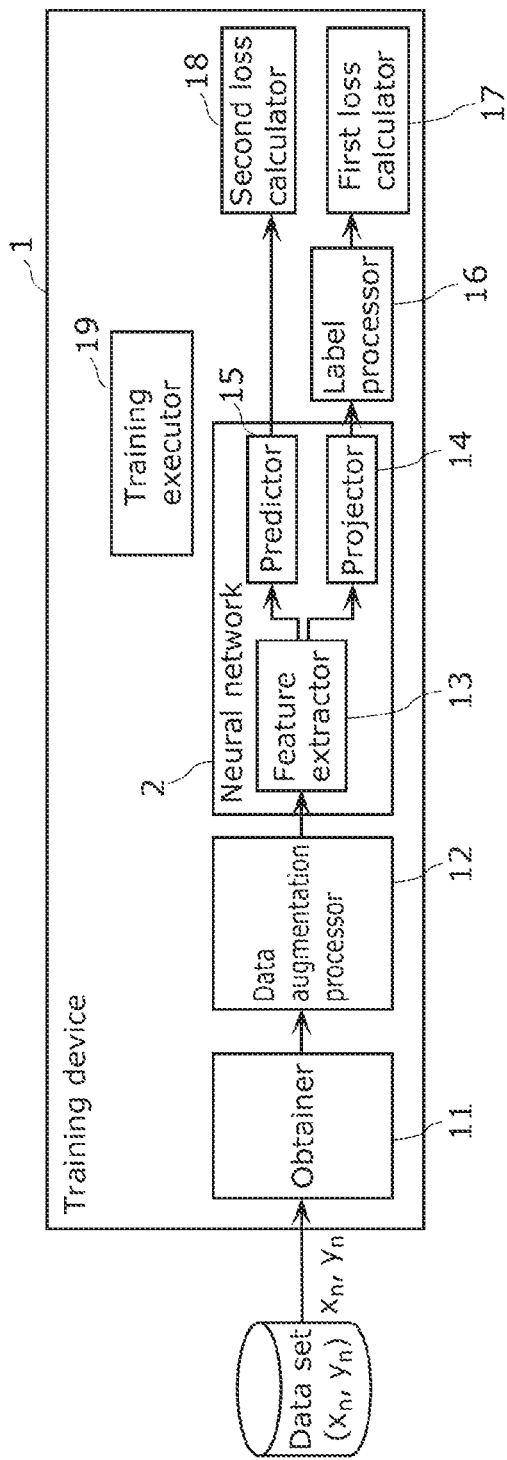
FIG. 1 is a block diagram illustrating a functional configuration of a training device according to an embodiment.

DESCRIPTION OF EMBODIMENTS (Underlying Knowledge Forming Basis of the Present Disclosure)

The inventors of the present application found that the training method according to NPL 1 stated in the "Background" section have problems as below.

Specifically, the training method disclosed in NPT 1 is a training method on the assumption of a classification task, and has problems that the method is inapplicable to learning of an object detection task, for instance.

In order to address such problems, a training method according to an aspect of the present disclosure is a training method performed by a computer to train a neural network model that includes a first network branch for representation learning with use of supervised contrastive learning, and a second network branch for training of computer vision tasks that include a classification task and a task other than the classification task, the neural network model including: an encoder network model shared by the first network branch and the second network branch; a first model included in only the first network branch; and a second model included in only the second network branch, the training method including: obtaining N image data that is one or more image data items and one or more labels in one-to-one association with the N image data from a data set that includes one or more preprovided image data items and one or more preprovided labels, N denoting an integer greater than or equal to 1; performing data augmentation processing on the N image data obtained and the one or more labels obtained, which are in one-to-one association with the N image data, to obtain M image data items and labels in one-to-one association with the M image data items, M denoting an integer multiple of N; extracting, by the encoder network model, feature representations of the M image data items from the M image data items; projecting, by the first model, the feature representations of the M image data items that are extracted, onto embedding vectors for use in the supervised contrastive learning; performing label processing for converting the labels of the M image data items into labels applicable to the representation learning, as labels of the computer vision tasks; training the encoder network model and the first model with use of a first loss function for use in the supervised contrastive learning, the labels of the M image data items on which the label processing has been performed, and the embedding vectors of the M image data items; obtaining the M image data items resulting from the data augmentation processing; extracting, by the encoder network model, feature representations of the M image data items from the M image data items obtained; inferring, by the second model, labels of the M image data items from the feature representations of the M image data items that are extracted; and training the encoder network model and the second model with use of a second loss function for use in the training, the labels of the M image data items that are inferred, and the labels of the M image data items. The training of the encoder network model and the first model and the training of the encoder network model and the second model are simultaneously performed.

As stated above, a label of a task other than a classification task can be converted into a label applicable to representation learning as a label of computer vision tasks, by performing label processing, and thus there is a possibility that supervised contrastive learning can be utilized for a task other than a classification task, such as an object detection task, for example.

Accordingly, there is a possibility that a training method applicable to training of the computer vision tasks other than the classification task can be achieved.

The embodiments described below each show a specific example of the present disclosure. The numerical values, shapes, elements, steps, and the processing order of the steps, for instance, described in the following embodiments are examples, and thus are not intended to limit the present disclosure. Among the elements in the following embodiments, elements not recited in any of the independent claims are described as arbitrary elements. In all the embodiments, features of embodiments can be combined.

Embodiments

[1 Training Device 1]

The following describes training device 1 and a training method according to the present embodiment.

Training device 1 includes a computer that includes memory and a processor (a microprocessor), and the processor executes a control program stored in the memory to implement various functions and train a neural network model.

FIG. 1 is a block diagram illustrating a functional configuration of training device 1 according to the present embodiment.

As illustrated in FIG. 1, training device 1 includes obtainer 11, data augmentation processor 12, feature extractor 13, projector 14, predictor 15, label processor 16, first loss calculator 17, second loss calculator 18, and training executor 19. Note that training device 1 does not necessarily include obtainer 11 and data augmentation processor 12.

[1-1 Obtainer 11]

Obtainer 11 obtains N (N is an integer greater than or equal to 1) image data that is one or more image data items and one or more labels in one-to-one association with the N image data from a data set that includes one or more preprovided image data items and one or more preprovided labels, and output the N image data and the one or more labels to data augmentation processor 12.

The data set herein is a data set preprovided for training of computer vision tasks.

Figure 2:
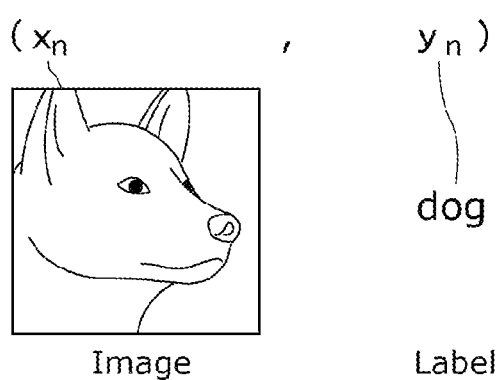
FIG. 2 illustrates an example of a pair of an image data item and a label according to the embodiment.

FIG. 2 illustrates an example of a pair of an image data item and a label according to the present embodiment.

In the present embodiment, obtainer 11 obtains a pair of an image (image data item) and a label ($\{x_n, y_n\}_{n=1 \ldots N}$), from the data set. N denotes an integer greater than or equal to 1, and means a batch size in the present embodiment.

As illustrated in FIG. 2, an example of a pair of image data item $x_n$ and label $y_n$ is a pair formed by an image in which a dog is captured and a label "dog".

[1-2 Data Augmentation Processor 12]

Data augmentation processor 12 perfumes data augmentation processing on the obtained N image data items and the one or more labels in one-to-one association with the N image data, and obtains M image data items (M denotes an integer multiple of N) and labels in one-to-one association with the M image data items. Data augmentation processor 12 outputs the M image data items (M denotes an integer multiple of N) to feature extractor 13.

Here, data augmentation processing is a technique for increasing the number of image data items by performing conversion processing on image data. Thus, data augmentation processor 12 performs, on the N image data obtained by obtainer 11 from the data set, data conversion processing such as, for example, rotation processing, zooming processing, translation processing, and color conversion processing to augment (increase the number of) the N image data, and associates labels with the resultant image data items. Note that a data preprocessor that performs preprocessing such as adjustment and normalization of an image size may be provided downstream of data augmentation processor 12, or stated differently, between data augmentation processor 12 and feature extractor 13.

Figure 3A:
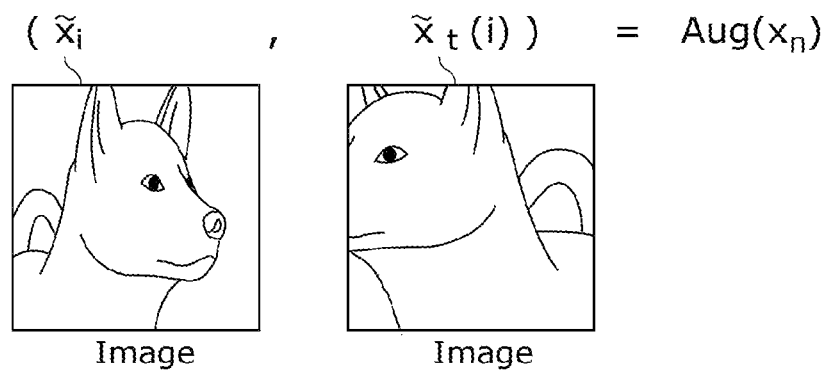
FIG. 3A illustrates examples of image data items obtained by data augmentation processing according to the embodiment.
Figure 3B:
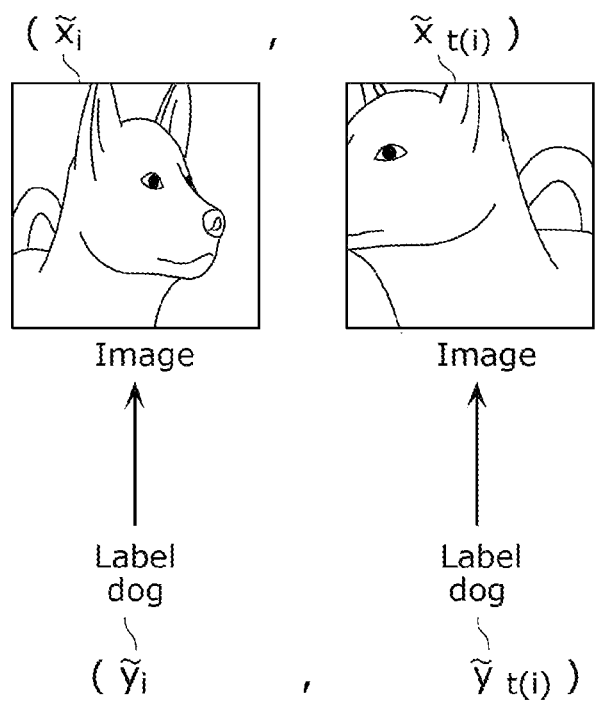
FIG. 3B illustrates examples of the image data items obtained by data augmentation processing and labels, according to the present embodiment.

FIG. 3A illustrates examples of image data items obtained by data augmentation processing according to the present embodiment. FIG. 3B illustrates examples of the image data items obtained by data augmentation processing and labels, according to the present embodiment.

In the present embodiment, data augmentation processor 12 performs data augmentation processing ($Aug(x_n, y_n)$) on a pair ($\{x_n, y_n\}_{n=1 \ldots N}$) formed by an image (an image data item) and a label which are obtained by obtainer 11 from the data set, to augment and double the image data item, for example.

Examples of image data items resulting from data augmentation processing are images in each of which a dog is captured and which are indicated by image data items $$\tilde{x}_i, \tilde{x}_{t(i)} \qquad [\text{Math 1}]$$

obtained by performing conversion processing on the image of a dog indicated by image data $x_n$, as illustrated in FIG. 3A. The images in each of which a dog is captured and which are indicated by such image data items $$\tilde{x}_i, \tilde{x}_{t(i)} \qquad [\text{Math 2}]$$

are given labels "dog", which are indicated by labels $$\tilde{y}_i, \tilde{y}_{t(i)} \qquad [\text{Math 3}]$$

as illustrated in FIG. 3B.

Note that subscripts t(i) and i denote indexes, and t(i) and i show that the original images are the same.

[1-3 Neural Network Model 2]

A neural network model trained by training device 1 is a deep neural network (DNN) model, and is a neural network model having a multilayer structure.

More specifically, a neural network model trained by training device 1 includes a first network branch and a second network branch. The first network branch is used to perform representation learning with use of supervised contrastive learning, and the second network branch is used to perform training of computer vision tasks that include a classification task and a task other than the classification task.

Here, representation learning is learning to automatically extract feature representations (features), and more specifically, is learning to be able to extract, as a feature representation, a data representation resulting from extracting only beneficial information in a task.

Contrastive learning is a technique for learning that images obtained from the same original image have embedding vectors close to each other in an embedding space, and images obtained from different original images have embedding vectors far from each other in the embedding space.

Supervised contrastive learning is learning, utilizing labeled data, to facilitate embedding vectors of data items labeled with the same class to be close to each other, and to facilitate embedding vectors of data items labeled with different classes to be far from each other. Accordingly, quality deterioration of feature representations due to false negative, that is, generation of a negative image from a sample image having the same class as that of an anchor can be reduced.

Figure 4:
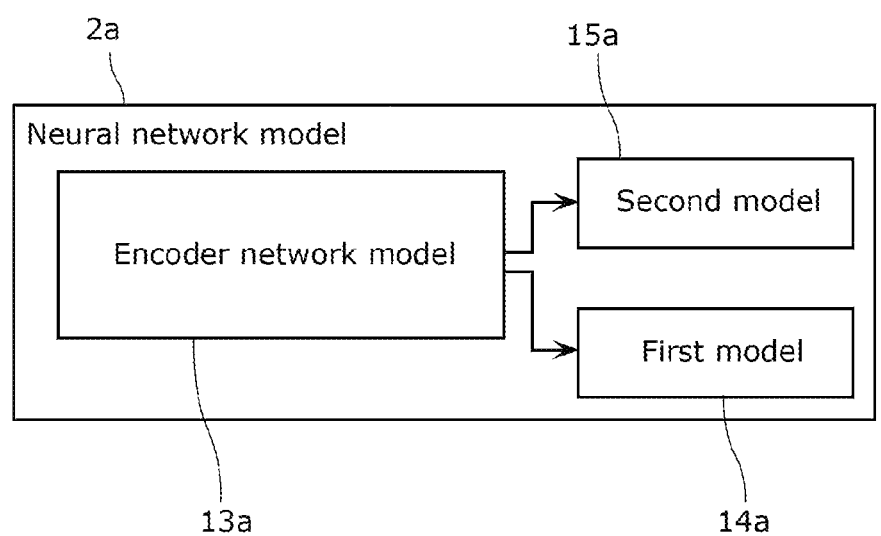
FIG. 4 conceptually illustrates an example of a structure of a neural network model according to the embodiment.

FIG. 4 conceptually illustrates an example of a structure of neural network model 2a according to the present embodiment.

Neural network model 2a is trained by training device 1. Neural network model 2a includes encoder network model 13a, first model 14a, and second model 15a. Encoder network model 13a, first model 14a, and second model 15a can be represented by functions.

Encoder network model 13a and first model 14a form a first network branch for representation learning with use of supervised contrastive learning. On the other hand, encoder network model 13a and second model 15a form a second network branch for training.

Encoder network model 13a is shared by the first network branch and the second network branch.

In the present embodiment, encoder network model 13a is used by feature extractor 13. Encoder network model 13a extracts a feature representation of input image data. Note that encoder network model 13a is a convolution neural network (CNN) model that includes a plurality of convolution layers, for example, but is not limited thereto. Encoder network model 13a may be a residual network (ResNet), a MobileNet, or a Transformer.

First model 14a is a neural network model included in only the first network branch, and is used by projector 14. First model 14a projects a feature representation output by encoder network model 13a onto an embedding vector for use in contrastive learning. Note that first model 14a is, for example, a multi-layer perceptron, but is not limited thereto.

Second model 15a is a neural network model included in only the second network branch, and is used by predictor 15. Second model 15a infers a label of image data input to encoder network model 13a, from a feature representation output by encoder network model 13a. Note that the configuration of second model 15a differs depending on a task. Second model 15a may be, for example, a logit model when the task is a classification task, but is not limited thereto.

In the present embodiment, the first network branch performs representation learning with use of supervised contrastive learning, to learn parameters such as weights of encoder network model 13a and first model 14a. The second network branch performs training to learn parameters such as weights of encoder network model 13a and first model 14a. Such two types of learning, that is, representation learning and training with use of supervised contrastive learning are performed simultaneously.

[1-3-1 Feature Extractor 13]

Feature extractor 13 obtains M image data items resulting from data augmentation processing. Feature extractor 13 causes encoder network model 13a to extract, from the obtained M image data items, feature representations of the M image data items.

Figure 5:
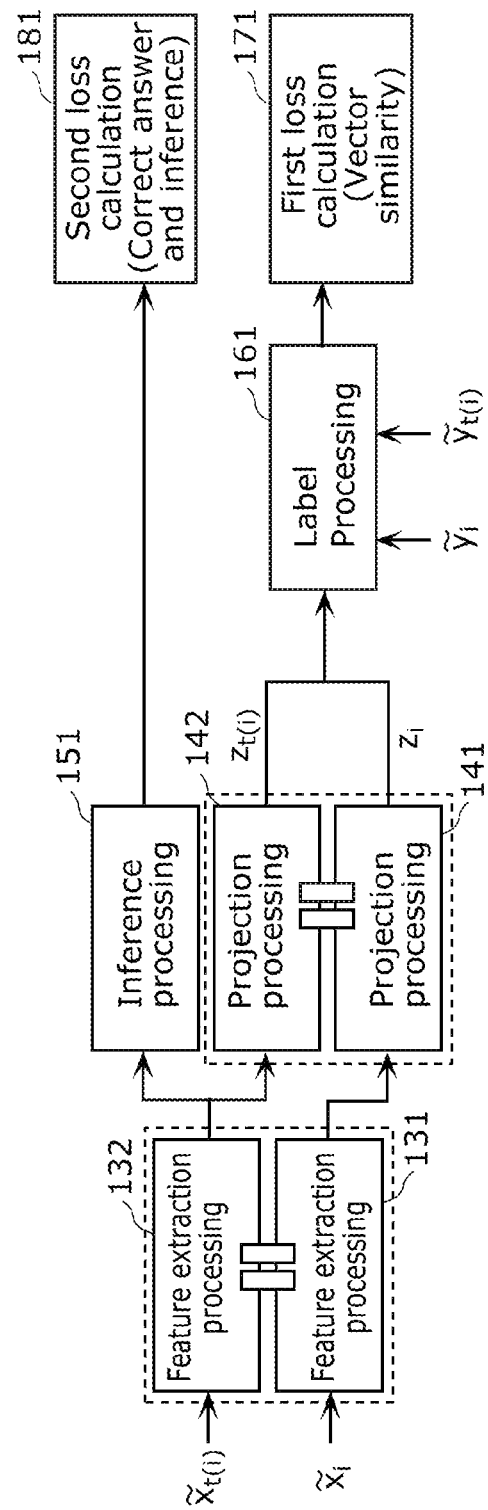
FIG. 5 is a diagram for conceptually explaining processing when the training method according to the present embodiment is executed.

FIG. 5 is a diagram for conceptually explaining processing when the training method according to the present embodiment is executed.

In the present embodiment, feature extractor 13 performs feature extraction processing 131 and 132 on image data items $$\tilde{x}_i, \tilde{x}_{t(i)} \qquad \text{[Math 4]}$$

resulting from data augmentation processing, and extracts and outputs feature representations to projector 14, as illustrated in FIG. 5, for example. The feature representations here are represented by vectors, for example. More specifically, in feature extraction processing 131, a feature representation is extracted from image data $$\tilde{x}_i \qquad \text{[Math 5]}$$

using encoder network model 13a. In feature extraction processing 132, a feature representation is extracted from image data $$\tilde{x}_{t(i)} \qquad \text{[Math 6]}$$

using encoder network model 13a. Note that encoder network model 13a used in feature extraction processing 131 is the same (the same function) as encoder network model 13a used in feature extraction processing 132.

[1-3-2 Projector 14]

Projector 14 projects (maps) an obtained feature representation onto an embedding space of an arbitrary vector dimension. More specifically, projector 14 causes first model 14a to project extracted feature representations of M image data items onto embedding vectors for use in supervised contrastive learning.

In the present embodiment, for example, as illustrated in FIG. 5, projector 14 performs projection processing 141 and 142. Projector 14 outputs, to label processor 16, embedding vectors obtained by performing projection processing 141 and 142. Note that first model 14a used in projection processing 141 is the same as first model 14a used in projection processing 142.

More specifically, in projection processing 141, a feature representation of image data $$\tilde{x}_i \qquad \text{[Math 7]}$$

which has been subjected to feature extraction processing 131 is projected onto an embedding vector $$z_i \qquad \text{[Math 8]}$$

using first model 14a.

Figure 6A:
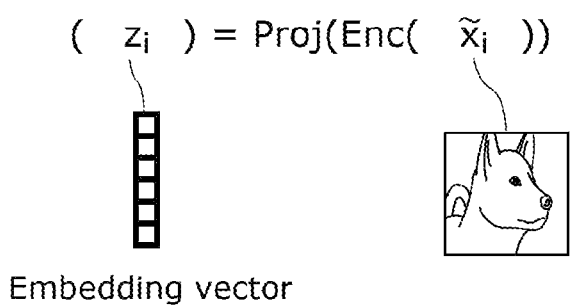
FIG. 6A conceptually illustrates an example of an embedding vector obtained by performing feature extraction processing and projection processing according to the embodiment.

FIG. 6A conceptually illustrates an example of an embedding vector obtained by performing feature extraction processing 131 and projection processing 141 according to the present embodiment. In FIG. 6A, Enc(•) means that feature extraction processing 131 is performed, and Proj(•) means that projection processing 141 is performed.

In projection processing 142, a feature representation of image data $$\tilde{x}_{t(i)} \qquad \text{[Math 9]}$$

on which feature extraction processing 132 has been performed is projected onto an embedding vector $$z_{t(i)} \qquad \text{[Math 10]}$$

using first model 14a.

Figure 6B:
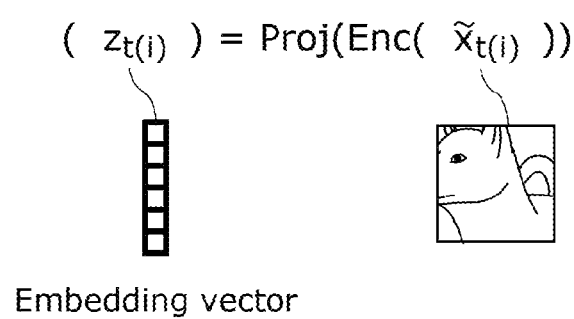
FIG. 6B conceptually illustrates an example of an embedding vector obtained by performing feature extraction processing and projection processing according to the present embodiment.

FIG. 6B conceptually illustrates an example of an embedding vector obtained by performing feature extraction processing 132 and projection processing 142 according to the present embodiment. In FIG. 6B, Enc( ) means that feature extraction processing 132 is performed, and Proj( ) means that projection processing 142 is performed.

[1-3-3 Predictor 15]

Predictor 15 causes second model 15a to infer, from the extracted feature representations of the M image data items, labels of the M image data items.

In the present embodiment, for example, as illustrated in FIG. 5, predictor 15 performs inference processing 151. Predictor 15 outputs an inference result obtained by performing inference processing 151 to second loss calculator 18.

More specifically, in inference processing 151, inference for the image-recognition technological filed task is performed using second model 15a, from a feature representation of image data $$\tilde{x}_{t(i)} \qquad \text{[Math 11]}$$

on which feature extraction processing 132 has been performed.

[1-4 Label Processor 16]

Label processor 16 performs label processing for converting labels of the M image data items into labels applicable to representation learning as labels of the computer vision tasks.

Here, for example, label processor 16 may perform label processing for converting the labels of the M image data items into one-hot representations in each of which a class dimension is used, the class dimension having a dimension count that is a class count of a class label used in the classification task.

More specifically, label processor 16 performs label processing by (i) converting the labels of two image data items into representations such as one-hot representations in which a value greater than or equal to 2 is allowed for a value of each of dimensions, and (ii) applying a step function that converts a value greater than β (β denotes an arbitrary number) for each of the dimensions in the one-hot representations into 1. In this manner, label processor 16 may perform label processing for converting labels of the M image data items into representations such as one-hot representations in which the value for each of the dimensions is 0 or 1.

Note that it is sufficient if label processor 16 can convert a label into a label applicable to representation learning as a label of the computer vision tasks, which is not limited to a one-hot representation.

Further, the step function is shown by Expression 1 below, for example, and outputs 1 for a value greater than β and outputs 0 for a value less than or equal to 13.

[Math 12]

$$y = \begin{cases} 1 & \text{if } x > \beta \\ 0 & \text{if } x \leq \beta \end{cases} \quad \text{(Expression 1)}$$

Note that when a representation converted into a one-hot representation, for example, includes a value of 1 for each of two or more dimensions, label processor 16 may convert the value for each of the two or more dimensions into 0.

Figure 7:
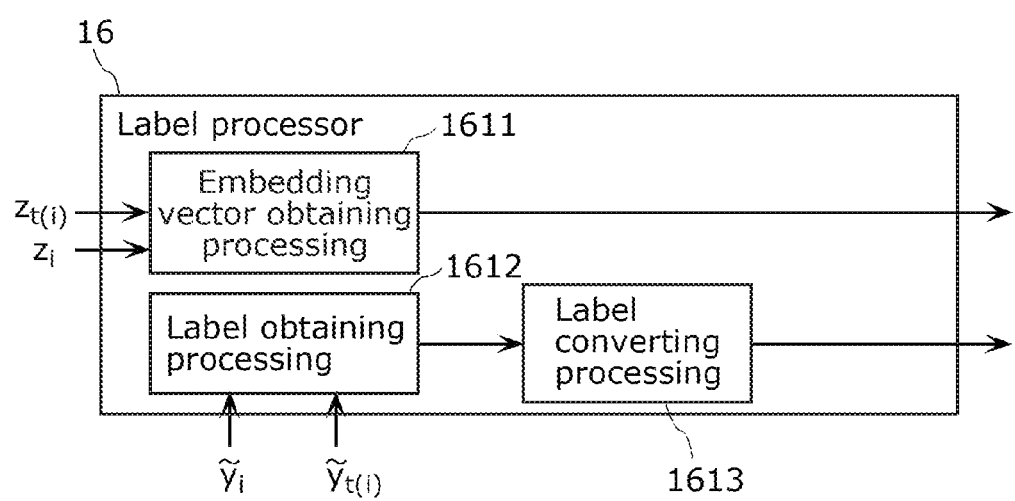
FIG. 7 illustrates details of label processing performed by a label processor according to the present embodiment.

FIG. 7 illustrates details of label processing 161 performed by label processor 16 according to the present embodiment.

In the present embodiment, label processor 16 performs label processing 161 illustrated in FIG. 5. More specifically, label processor 16 executes embedding vector obtaining processing 1611, label obtaining processing 1612, and label converting processing 1613, as illustrated in FIG. 7.

In vector obtaining processing 1611, embedding vectors $$z_i, z_{t(i)} \quad \text{[Math 13]}$$

obtained by performing projection processing 141 and 142 are obtained.

In label obtaining processing 1612, labels $$\tilde{y}_i, \tilde{y}_{t(i)} \quad \text{[Math 15]}$$

associated respectively with the embedding vectors $$z_i, z_{t(i)} \quad \text{[Math 14]}$$

obtained by performing vector obtaining processing 1611 are obtained.

In label converting processing 1613, labels $$\tilde{y}_i, \tilde{y}_{t(i)} \quad \text{[Math 16]}$$

obtained in label obtaining processing 1612 are converted into representations such as one-hot representations in each of which a class dimension is used, the class dimension having a dimension count that is a class count of a class label used in the classification task. Thereafter, the resultant representations are output to first loss calculator 17.

In the following, processing performed in label converting processing 1613 is to be described with reference to FIG. 8.

Figure 8:
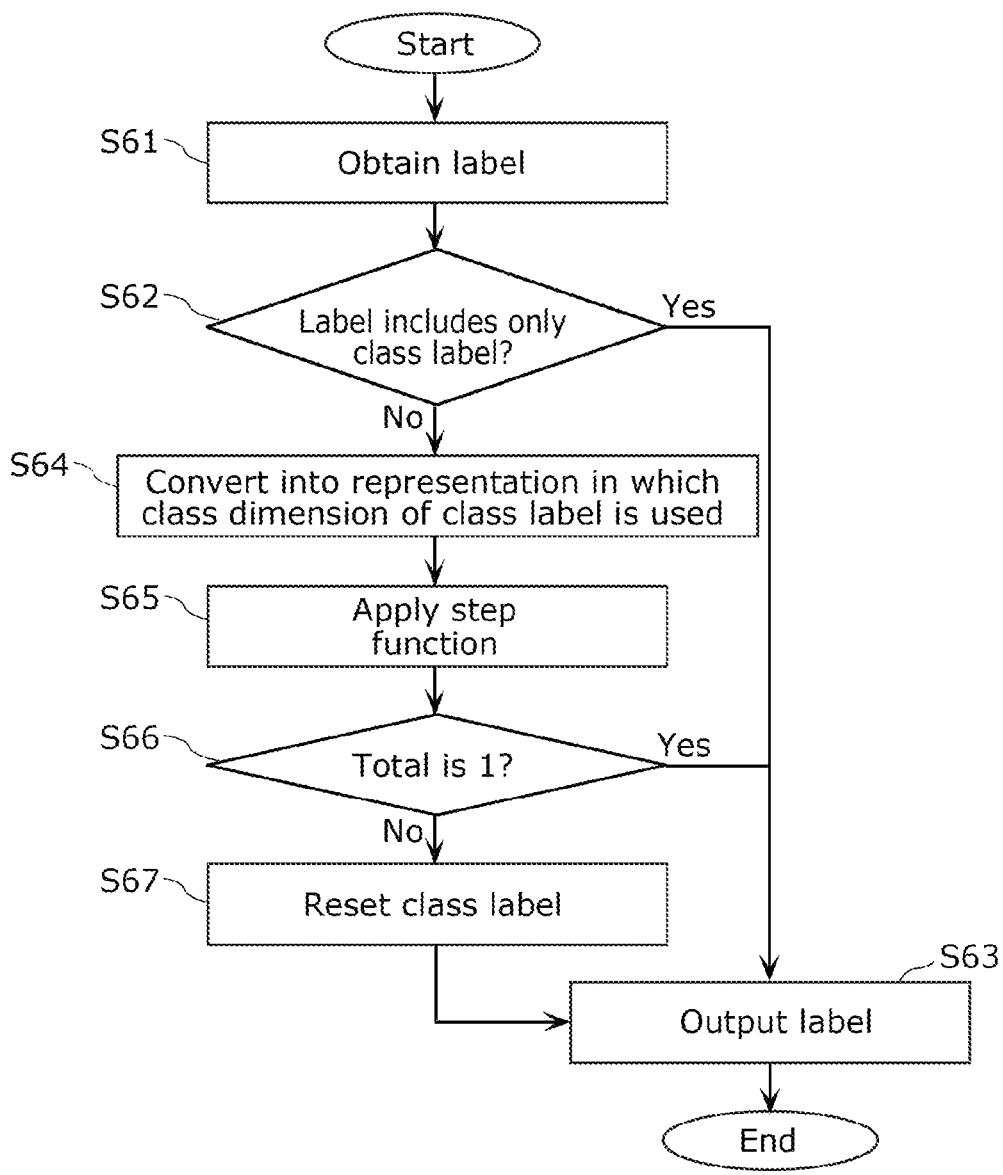
FIG. 8 is a flowchart for explaining an example of label obtaining processing and label converting processing that are performed by the label processor according to the embodiment.

FIG. 8 is a flowchart for explaining an example of label obtaining processing 1612 and label converting processing 1613 that are performed by label processor 16 according to the present embodiment. In FIG. 8, the case where conversion to a one-hot representation is performed is described as a main example, yet a representation to which conversion is performed is not limited thereto.

First, label processor 16 obtains a label (S61). In the present embodiment, label processor 16 performs label obtaining processing 1612, and obtains a label corresponding to an embedding vector output from projector 14.

Next, label processor 16 determines whether the label obtained in step S61 includes only a class label (S62). Here, a label that includes only a class label is a label given with a one-dimensional classification label showing whether or not a dog is captured in an image or whether or not a dog or a cat is captured in an image, for example. Note that if the label shows whether or not a dog is captured in an image, the label includes only a one-dimensional class label having a class count of 1. If the label shows whether or not a dog or a cat is captured in an image, the label includes only a one-dimensional class label having a class count of 2. Note that a label name is (cat, dog, person), and for example, Label1=(0, 1, 0) and Label2=(0, 2, 1). In this case, Label1 indicates that only a dog is captured. Label1 has one dimension and indicates that a class indicated by the label is of one type, whereas Label2 has one dimension and indicates that classes indicated by the label are of two types (dog and person).

In step S62, if the obtained label includes only a class label (Yes in S62), label processor 16 outputs the label obtained in step S61 to first loss calculator 17 (S63).

Figure 9:
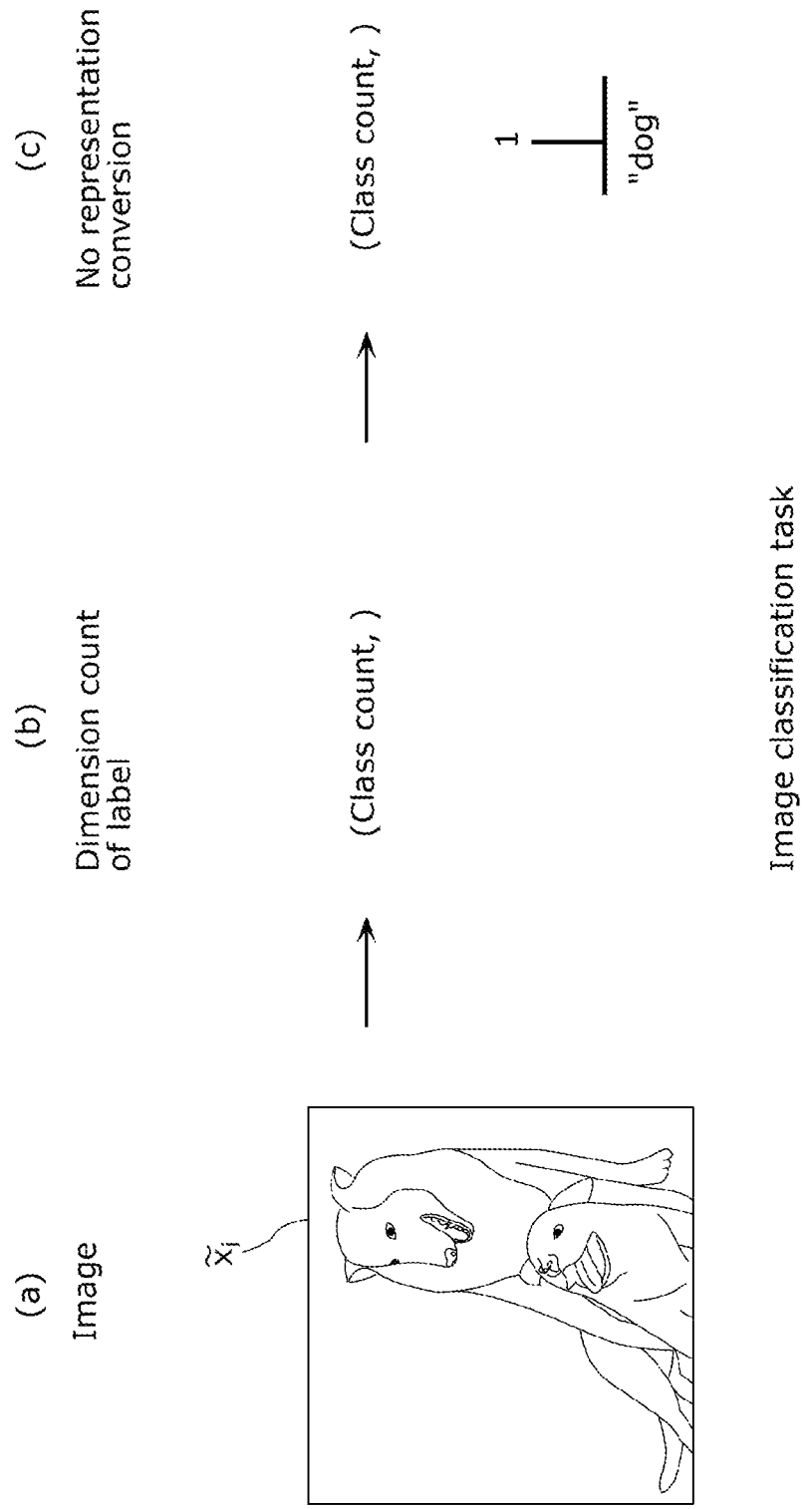
FIG. 9 illustrates an example of a label of an image classification task according to the embodiment.

FIG. 9 illustrates an example of a label of an image classification task according to the present embodiment.

A label of the image classification task for image data $$\tilde{x}_i \quad \text{[Math 17]}$$

of an image in which two dogs are captured as illustrated in (a) of FIG. 9 is "dog". In this case, the label is a label having a class count of 1 and including only a one-dimensional class label, and thus the dimension count of the label shown in (b) of FIG. 9 can be represented as (Class count). Such a label can be represented by a one-hot vector, as illustrated in (c) of FIG. 9. Accordingly, the one-hot vector representation illustrated in (c) of FIG. 9 can be output as a label to first loss calculator 17.

On the other hand, in step S62, if the obtained label does not include only a class label (No in S62), label processor 16 converts the label obtained in step S61 into a representation such as a one-hot representation in which a class dimension is used, the class dimension having a dimension count that is a class count of a class label used in the classification task (S64).

Here, a specific example of processing in step S64 is to be described.

Figure 10A:
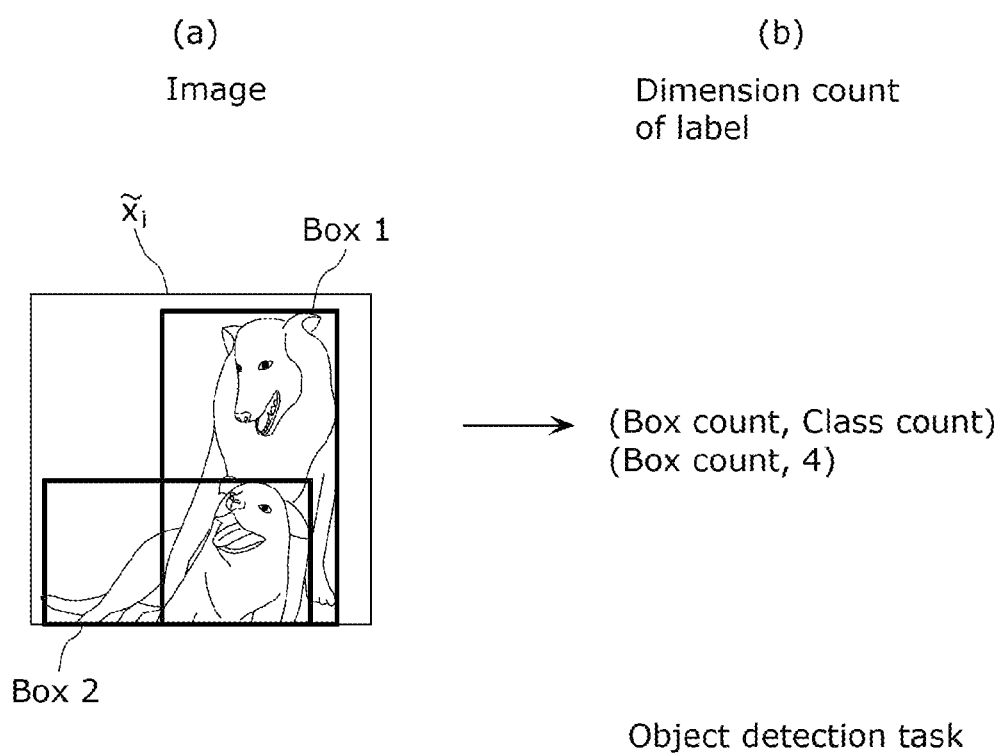
FIG. 10A illustrates an example of a label of an object detection task according to the embodiment.
Figure 10B:
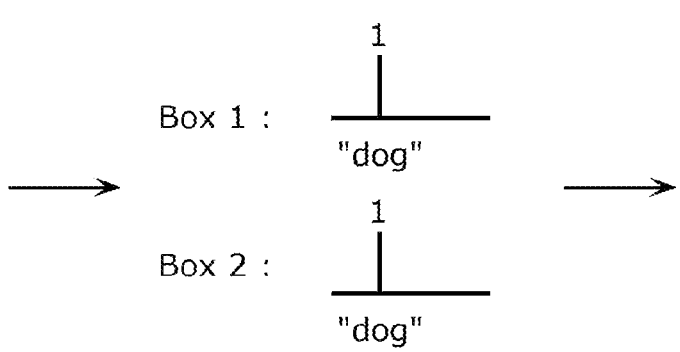
FIG. 10B illustrates an example of a label converted into a one-hot representation according to the embodiment.
Figure 10B:
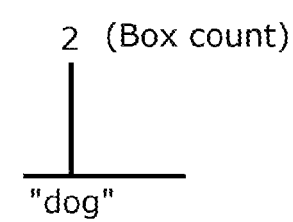

FIG. 10A illustrates an example of a label of an object detection task according to the present embodiment. FIG. 10B illustrates an example of a label converted into a one-hot representation according to the present embodiment.

The label of the object detection task associated with image data $$\tilde{x}_i \quad \text{[Math 18]}$$

of an image in which two dogs are captured as illustrated in (a) of FIG. 10A has box 1 given with "dog" and box 2 given with "dog". In this case, the label shows that the box count is 2, the class count is 1, and the box count is defined by four coordinate points, and thus the dimension count of the label can be represented by (Box count, Class count) and (Box count, 4) as illustrated in (b) of FIG. 10A. The dimension count of such a label is different from (Class count) that is the dimension count of the label illustrated in (b) of FIG. 9, and thus the representation thereof is converted into a representation having the dimension count (class dimension) of the label illustrated in (b) of FIG. 9. Thus, as illustrated in (c) of FIG. 10B, the representation is converted into a one-hot vector representation in which "dog" for box 1 is represented as 1 and a one-hot vector representation in which "dog" for box 2 is represented as 1. In (d) of FIG. 10B, the one-hot vector representations illustrated in (c) of FIG. 10B are added up.

In this manner, label processor 16 can convert the label of the object detection task, which is obtained in step S61, into a one-hot representation having a one-dimensional class count, the value of which is the box count, thus converting the representation into a one-hot representation in which a class dimension used in the classification task is used.

Figure 10C:
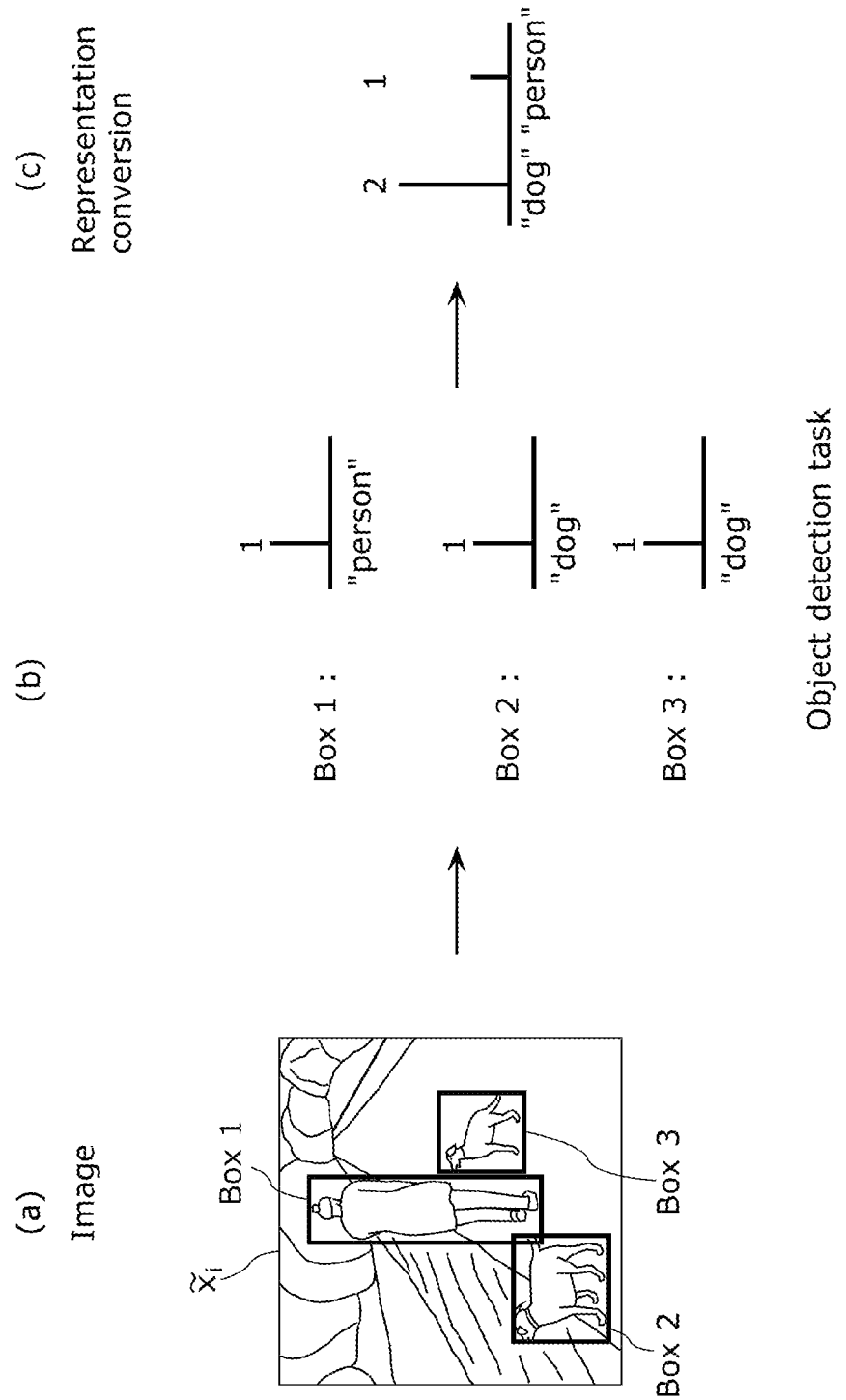
FIG. 10C illustrates another example of a label of the object detection task according to the embodiment.

FIG. 10C illustrates another example of a label of the object detection task according to the present embodiment.

The label of the object detection task associated with image data $$\tilde{x}_i \qquad \text{[Math 19]}$$

of an image in which two dogs and a person are captured as illustrated in (a) of FIG. 10C has box 1 given with "person", box 2 given with "dog", and box 3 given with "dog", for example. In this case, the label shows that the box count is 3, the class count is 2, and the box count is defined by four coordinate points. The dimension count of the label in this case can be represented by (Box count, Class count) and (Box count, 4). The dimension count of such a label is different from (Class count) that is the dimension count of the label illustrated in (b) of FIG. 9, and thus the representation thereof is converted into a representation in which the dimension count (class dimension) of the label illustrated in (b) of FIG. 9 is used. Thus, as illustrated in (b) of FIG. 10C, the representation is converted into a one-hot vector representation in which "person" for box 1 is represented as 1, a one-hot vector representation in which "dog" for box 2 is represented as 1, and a one-hot vector representation in which "dog" for box 3 is represented as 1. The one-hot vector representations illustrated in (b) of FIG. 10C are added up to be converted into a representation other than a one-hot vector representation, as illustrated in (c) of FIG. 10C. Note that a one-hot vector representation indicates a vector in which one has an element of 1 and the others each have an element of 0. Thus, the representation illustrated in (c) of FIG. 10C applies to an example of a representation other than a one-hot representation, which is applicable to representation learning as a label of the computer vision tasks.

In this manner, label processor 16 can convert the label of the object detection task, which is obtained in step S61, into a representation such as a one-hot representation having a two-dimensional class count, the value of which is the box count, thus converting the representation into a representation in which a class dimension used in the classification task is used.

Figure 11:
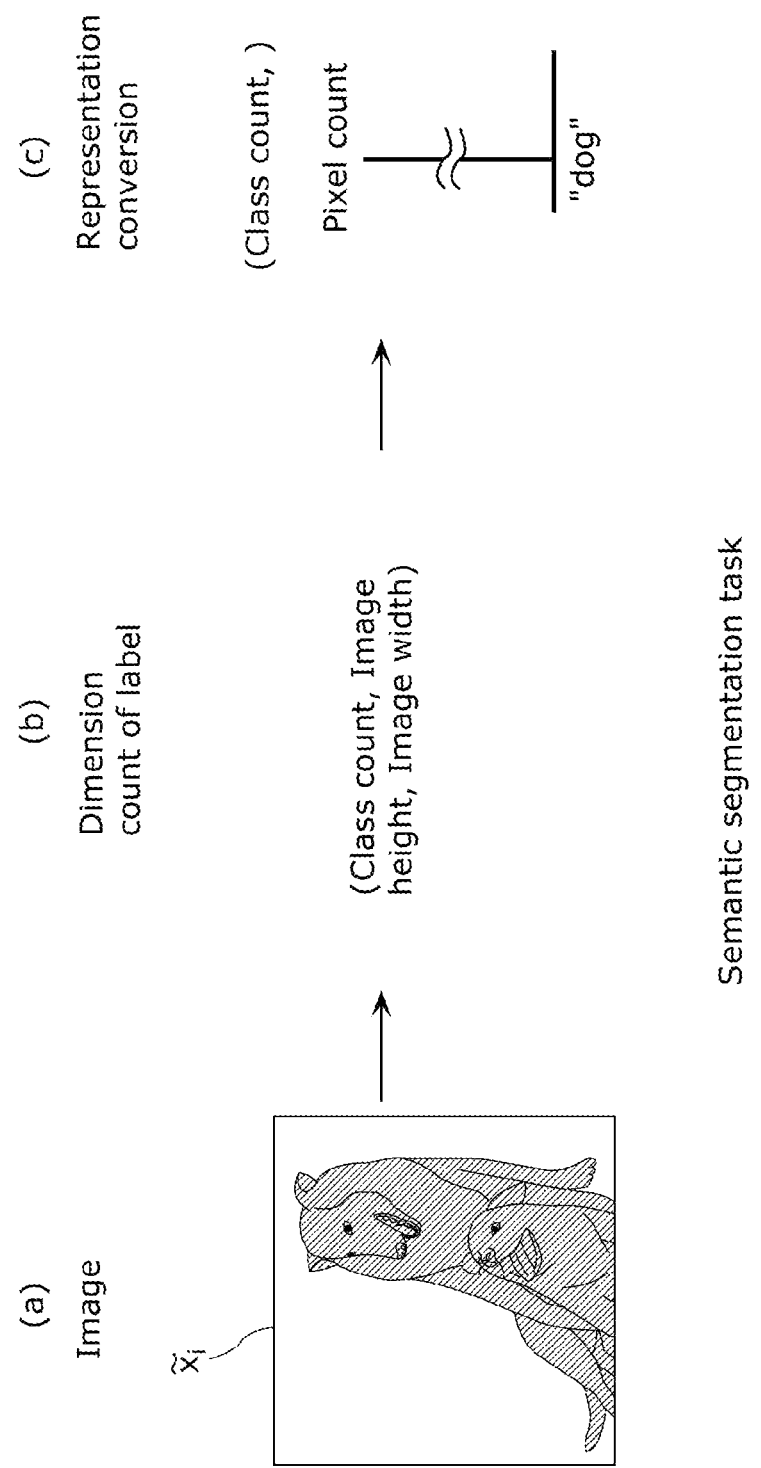
FIG. 11 illustrates an example of a label of a semantic segmentation task according to the embodiment.

FIG. 11 illustrates an example of a label of a semantic segmentation task according to the present embodiment.

A label of the object detection task associated with image data $$\tilde{x}_i \qquad \text{[Math 20]}$$

of an image in which two dogs are captured illustrated in (a) of FIG. 11 is a label in which "dog" is given to each of the pixels in a region (the hatched region in the drawing) where two dogs are shown, for example. In this case, the label is defined by 1 that is the class count and the image height and the image width that define the region, and the dimension count of the label can be represented by (Class count, Image height, Image width). The dimension count of such a label is different from (Class count) that is the dimension count of the label illustrated in (b) of FIG. 9, and thus the representation thereof is converted into a representation having the dimension count (class dimension) of the label illustrated in (b) of FIG. 9. Stated differently, the representation is converted into one-hot vector representations for the pixels, in which "dog" given to the pixel is 1, and the one-hot representations are added up. In this manner, as illustrated in (c) of FIG. 11, the representations can be converted into a one-hot vector representation having a one-dimensional class count, that is, "dog", the value of which is the pixel count (the number of pixels) in the region.

In this manner, label processor 16 can convert the label of the object detection task, which is obtained in step S61, into a representation having a one-dimensional class count, the value of which is the number of pixels, thus converting the representation into a representation including a one-hot representation in which a class dimension used in the classification task is used.

Now, referring back to FIG. 8, description of the processing performed by label processor 16 is to be continued.

Next, label processor 16 applies a step function to a one-hot vector representation resulting from the conversion in step S64 (S65). Accordingly, label processor 16 can convert a value greater than 0 ($\beta$=0) for each dimension in a representation including a one-hot representation into 1, by applying the step function.

Here, specific examples of the processing in step S65 are to be described.

Figure 12:
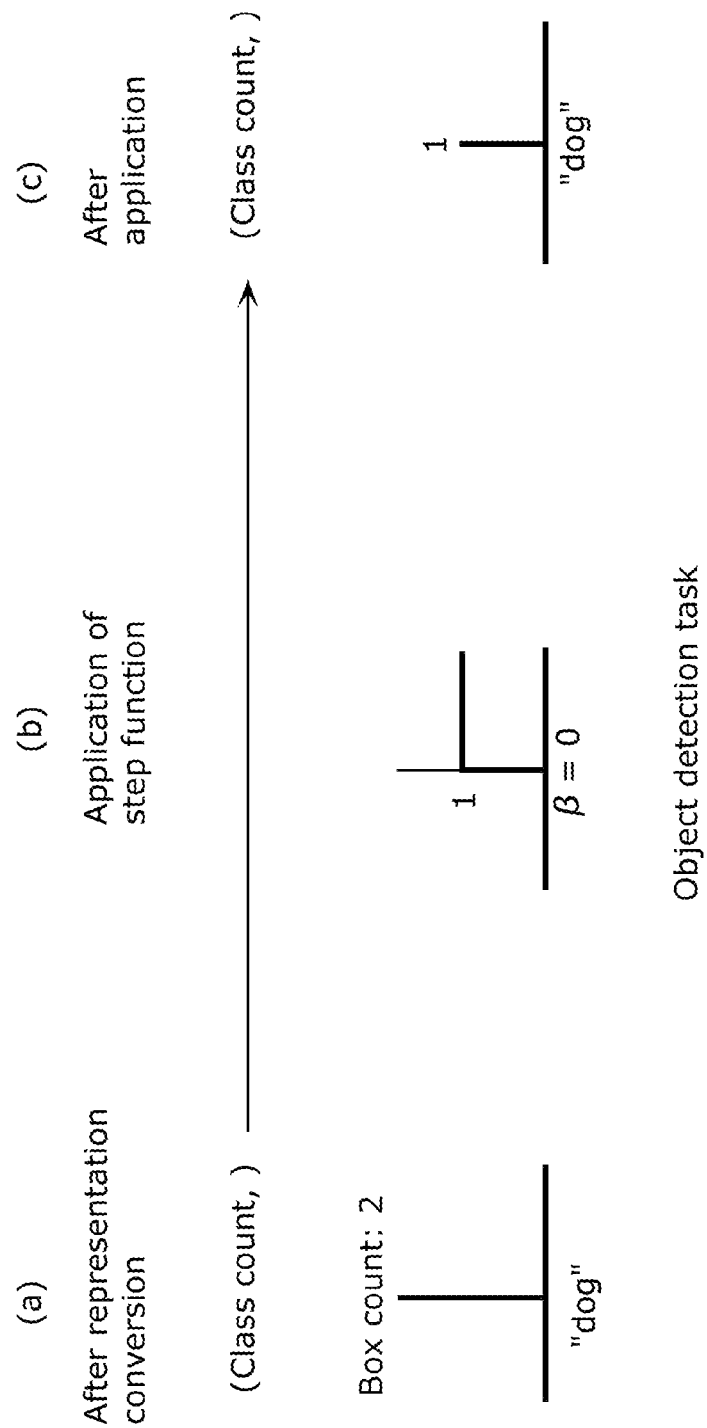
FIG. 12 illustrates an example of a label after representation conversion, to which a step function according to the embodiment has been applied.
Figure 13:
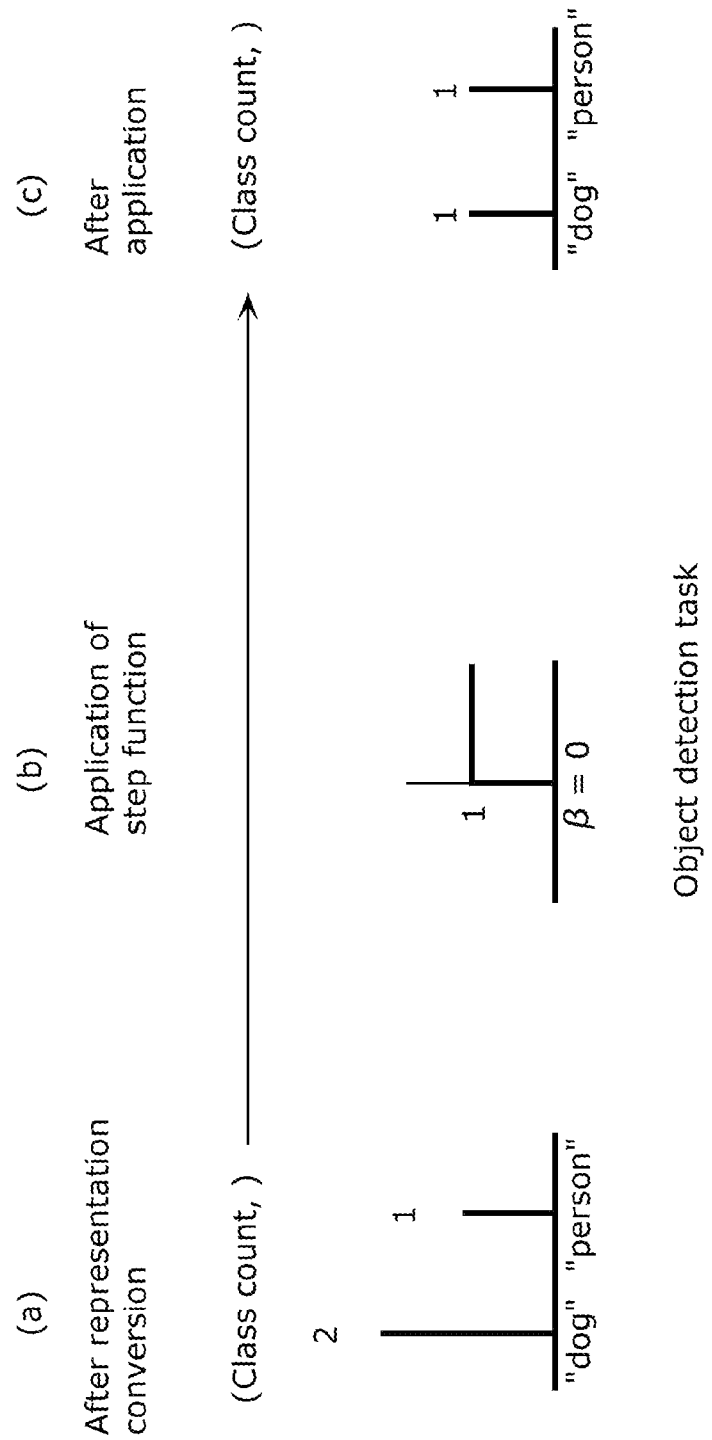
FIG. 13 illustrates an example of a label after representation conversion, to which a step function according to the embodiment has been applied.
Figure 14:
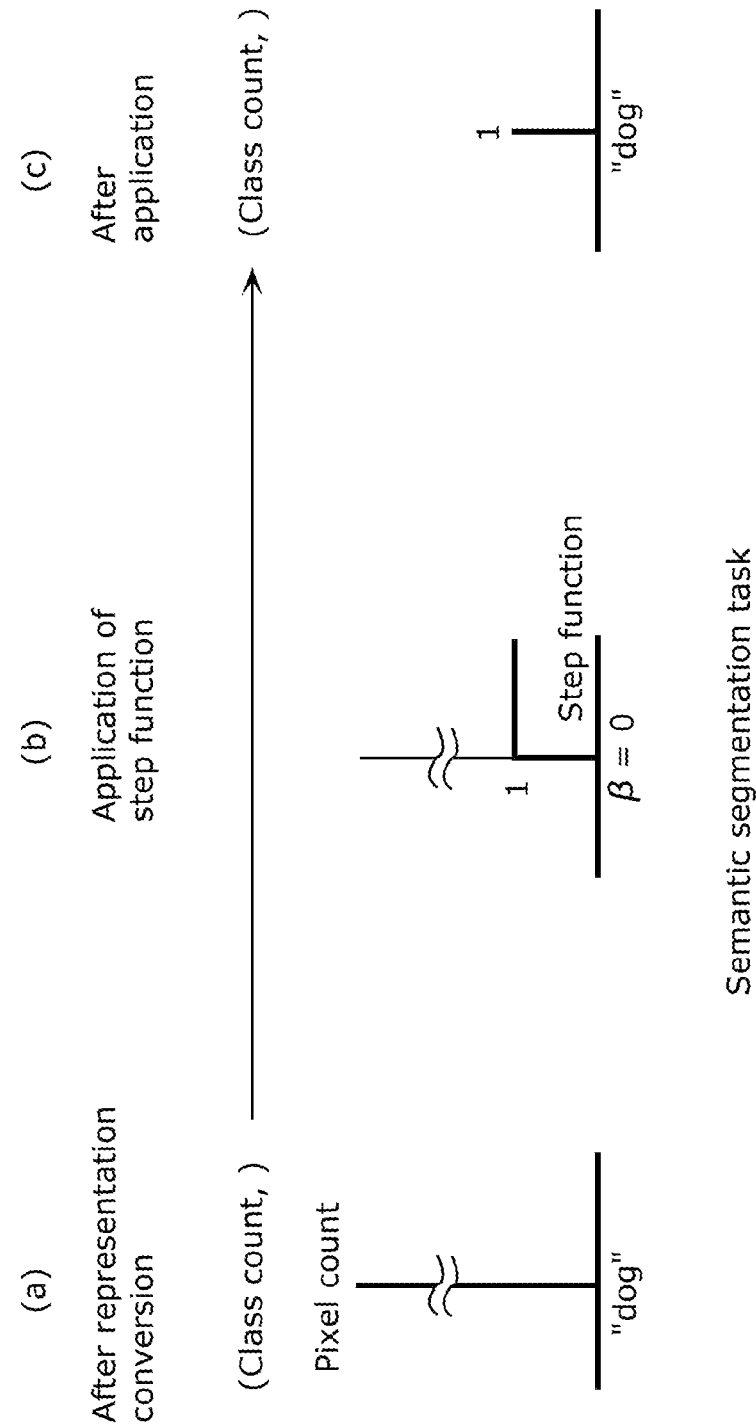
FIG. 14 illustrates an example of a label after representation conversion, to which a step function according to the embodiment has been applied.

FIG. 12 to FIG. 14 illustrate examples of labels after representation conversion, to which the step function according to the present embodiment has been applied.

Part (a) of FIG. 12 illustrates the label illustrated in (d) of FIG. 10B, or stated differently, a label in which the value of "dog" according to the object detection task after representation conversion is 2. Part (b) of FIG. 12 illustrates a state in which a step function of outputting value 1 when a value is greater than threshold 13 is applied to the label after representation conversion illustrated in (a) of FIG. 12. Part (c) of FIG. 12 illustrates that a label is obtained in which the value of "dog" is 1 as a result of applying the step function to the label after representation conversion illustrated in (a) of FIG. 12.

In this manner, label processor 16 can convert a value greater than 0 ($\beta$=0) for each dimension in a one-hot representation, by applying the step function to the one-hot vector representation resulting from the conversion in step S64.

Part (a) of FIG. 13 illustrates the label illustrated in (c) of FIG. 10C, or stated differently, a label of the object detection task after representation conversion, in which the value of "dog" is 2 and the value of "person" is 1. Part (b) of FIG. 13 illustrates a state in which the step function of outputting value 1 when the value is greater than threshold 13 is applied to the label after representation conversion illustrated in (a) of FIG. 13. Part (c) of FIG. 13 illustrates that a label is obtained in which the value of "dog" is 1 and the value of "person" is 1 as a result of applying the step function to the label after representation conversion illustrated in (a) of FIG. 13.

In this manner, label processor 16 can convert, into 1, a value greater than 0 ($\beta$=0) for each dimension in a representation by applying the step function to the representation resulting from the conversion in step S64.

Part (a) of FIG. 14 illustrates the label illustrated in (c) of FIG. 11, or stated differently, a label of the semantic segmentation task after representation conversion, in which the value of "dog" is shown by a pixel count. Part (b) of FIG. 14 illustrates a state in which the step function of outputting value 1 when a value is greater than threshold 13 is applied to the label after representation conversion illustrated in (a) of FIG. 14. Part (c) of FIG. 14 illustrates that a label is obtained in which the value of "dog" is 1 as a result of applying the step function to the label after representation conversion illustrated in (a) of FIG. 14.

In this manner, label processor 16 can convert a value greater than 0 for each dimension in a one-hot representation, by applying the step function to the one-hot vector representation resulting from the conversion in step S64.

Now, referring back to FIG. 8, description of the processing performed by label processor 16 is to be continued.

Next, label processor 16 determines whether a total of values in a representation such as a one-hot vector representation resulting from applying the step function in step S65 is 1 (S66).

In step S66, if the total is 1 (Yes in S66), label processor 16 outputs, to first loss calculator 17, a label that includes the representation resulting from applying the step function (S63).

On the other hand, in step S66, if the total is not 1 (No in S66), the class label is reset (S67), and a label resulting from resetting the class label is output to first loss calculator 17 (S63). More specifically, in step S67, when a representation such as a one-hot representation resulting from applying the step function has a value of 1 for each of two or more dimensions, label processor 16 resets the class label by changing the value for each of two or more dimensions to 0.

Here, an example of processing in step S67 is to be described.

Figure 15:
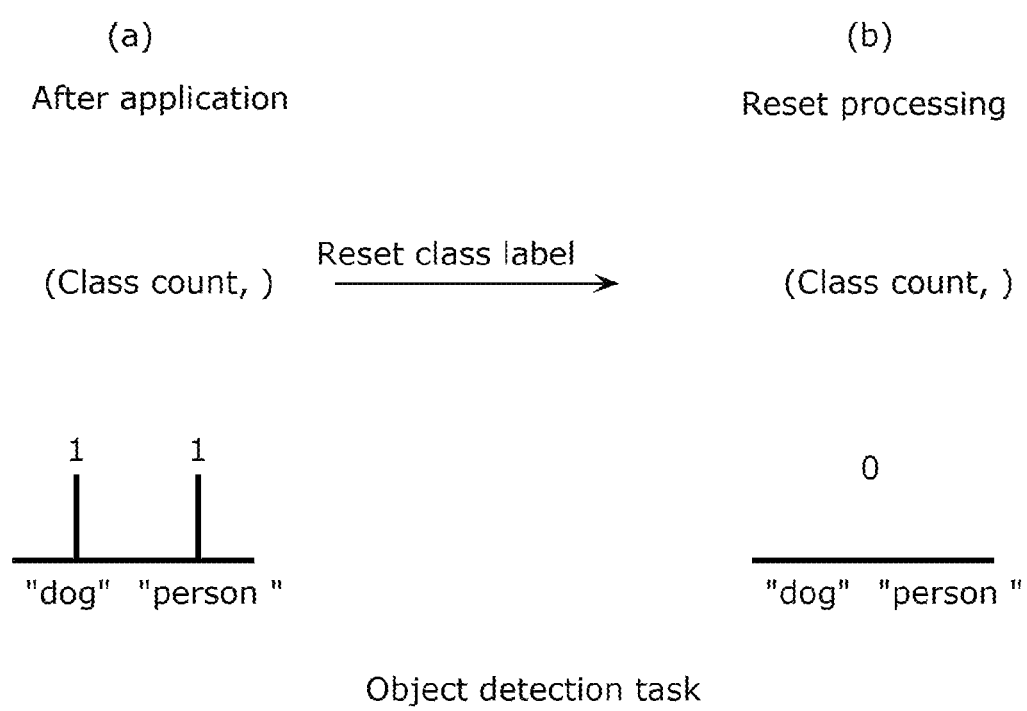
FIG. 15 illustrates an example of processing of resetting a class label according to the embodiment.

FIG. 15 illustrates an example of processing of resetting a class label according to the present embodiment.

Part (a) of FIG. 15 illustrates the label illustrated in (c) of FIG. 13, or stated differently, a label which results from applying the step function and in which the value of "dog" is 1 and the value of "person" is 1. Part (b) of FIG. 15 illustrates a state in which resetting processing is performed on the class label to reset the values of "dog" and "person" illustrated in (a) of FIGS. to 0.

In this manner, label processor 16 performs label processing for converting labels of two image data items into representations in each of which a class dimension that is a class count of a class label used in the classification task is used.

Note that the processing described in step S66 and step S67 may not be performed. Thus, label processor 16 may output, to first loss calculator 17, a representation such as a one-hot representation resulting from applying the step function, as a label, even if the representation has a value of 1 for each of two or more dimensions.

[1-5 First Loss Calculator 17]

First loss calculator 17 performs first loss calculation 171 for calculating a first loss function for use in supervised contrastive learning, from the labels of M image data items on which the label processing has been performed and embedding vectors of the M image data items.

In the present embodiment, first loss calculator 17 calculates a loss based on vector similarities of M image data items, by performing first loss calculation 171 illustrated in FIG. 5.

Here, the first loss function is a loss function with which a loss based on a vector similarity can be calculated, to attract image data items belonging to the same class in an embedding space and separate image data items belonging to different classes in the embedding space. As the first loss function, contrastive loss function $L^{sup}$ represented by, for example, Expression 2, or more specifically, Expression 3 to Expression 5, can be used. Note that Expression 5 shows determination as to whether classes shown by labels are the same.

[Math 21]

$$\mathcal{L}^{sup} = \sum_{i \in I} \frac{1}{|P(i)|} \sum_{p \in P(i)} \mathcal{L}^{base}_{i,p} \quad \text{(Expression 2)}$$

[Math 22]

$$\mathcal{L}^{sup} = \sum_{i \in I} \frac{-1}{|P(i)|} \sum_{p \in P(i)} \log \frac{\exp(z_i \cdot z_p/\tau)}{\sum_{a \in A(i)} \exp(z_i \cdot z_a/\tau)} \quad \text{(Expression 3)}$$

[Math 23]

$$A(i) = I \setminus \{i\} \quad \text{(Expression 4)}$$

$$P(i) = \{p \in A(i) : \tilde{y}_p = \tilde{y}_i\} \quad \text{(Expression 5)}$$

Note that I denotes all image data items obtained by performing data augmentation processing, which correspond to M image data items described above. Further, i denotes an anchor image, A denotes all images other than i that denotes an anchor image, and p denotes an image to be learned. Further, z denotes an embedding representation of an image, and T denotes a hyperparameter referred to a temperature.

Figure 16:
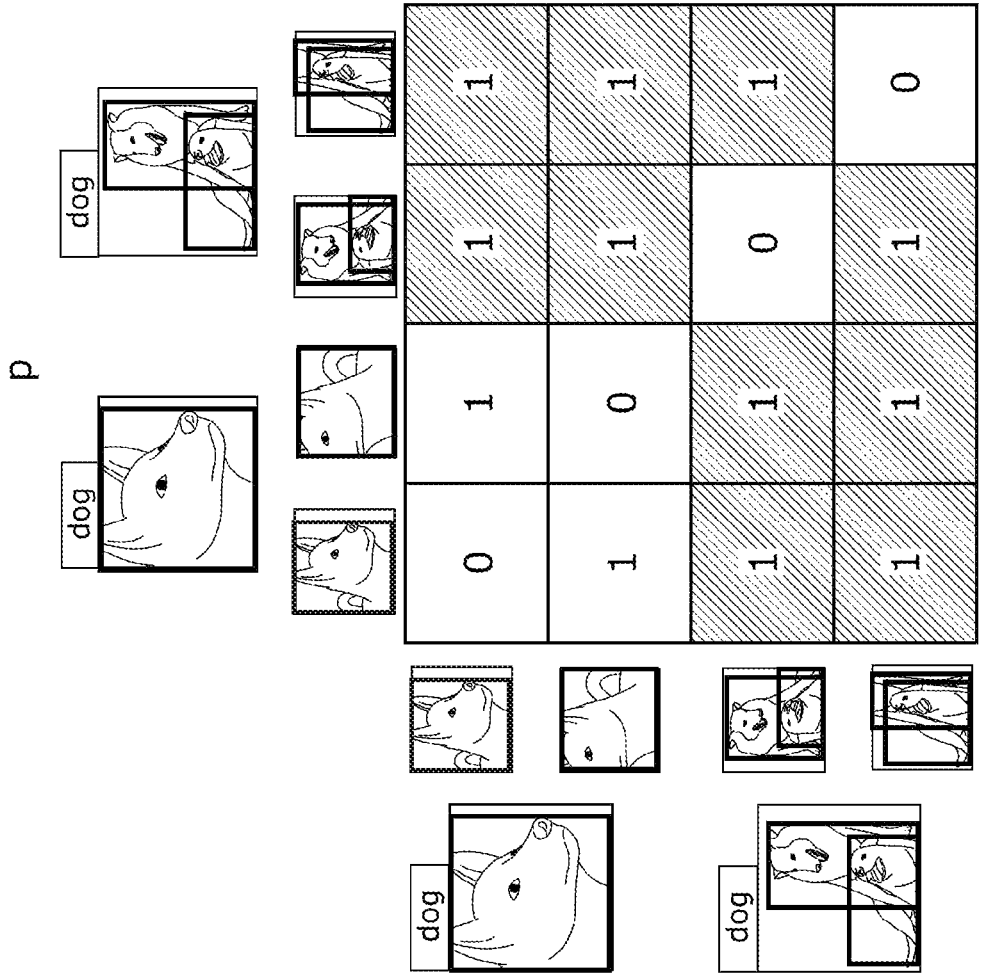
FIG. 16 illustrates examples of results of label processing when labels have one type of class, according to the embodiment.

FIG. 16 illustrates examples of results of label processing when labels have one type of class, according to the present embodiment.

FIG. 16 illustrates four images obtained by performing data augmentation processing on two original images. Four images at positions given with i correspond to anchor images, and four images at positions given with p correspond to target images for contrastive learning. The elements in the table illustrated in FIG. 16 each show a calculation result of Expression of the first loss function, or stated differently, whether the image is a paired image with a target to be attracted by contrastive learning. If the image is a paired image with which contrastive learning is performed, the value of 1 is shown, and if not, the value of 0 is shown. Note that if a pair is formed by the same images, it is not necessary to perform contrastive learning even if the class is the same, and thus the value of 0 is shown.

Thus, in the present embodiment, as can be seen from FIG. 16, image pairs shown in hatched regions are to be subjected to contrastive learning. This is because by label processing, the first loss function that is a contrastive loss function can be calculated also for a label used in a task other than the classification task.

FIG. 17A illustrates other examples of results of label processing when labels have one or more types of classes, according to the present embodiment. FIG. 17B conceptually illustrates a first loss calculation that produces results illustrated in FIG. 17A.

FIG. 17A also illustrates four images obtained by performing data augmentation processing on two original images. Four images at positions given with i correspond to anchor images, and four images at positions given with p correspond to target images for contrastive learning.

The table illustrated in FIG. 17A shows an example of a case where reset processing is performed since one of two images on the left lower portion and one of two images on the upper right side each have a two-dimensional class label. If an anchor image corresponding to a label whose class label is reset by label processing is one image of an image pair, the value resulting from calculating Expression 5 of the first loss function is 0. As illustrated in FIG. 17B, each of the elements in the table calculated in A(i), which are illustrated in (a) of FIG. 17B, is multiplied by an element in the table illustrated in (b) of FIG. 17B, which is calculated to be 1 if $$\tilde{y}_p = \tilde{y}_i \quad \text{[Math 24]}$$

thus obtaining results as illustrated in (c) of FIG. 17B, which are the same as those of the table illustrated in FIG. 17A. More specifically, in A(i) illustrated in (a) of FIG. 17B, if indexes indicated by labels are the same (i=p), the value of 0 is shown, and if the indexes are different, the value of 1 is shown. Each of the elements in the table illustrated in (b) of FIG. 17B, which are calculated by using $$\tilde{y}_p = \tilde{y}_i, \quad \text{[Math 25]}$$

the value of 1 is shown when the labels are the same, and the value of 0 is shown when the labels are different.

In such a case, training executor 19 later described does not utilize a label on which reset processing has been performed, as label information in supervised contrastive learning. This means that image data associated with a label that includes two or more correct answers out of image data items resulting from data augmentation is not utilized, and the number of data items included in a data set resulting from data augmentation becomes insufficient, and thus training in supervised contrastive learning may be unstable.

In view of this, rather than the first loss function shown by Expression 2 to Expression 5, a first loss function shown by Expression 2 and Expression 3 stated above and Expression 4 and Expression 6 shown below may be used. Thus, a first loss function shown by Expression 6 in which a condition for taking the value of 1 if different images are obtained by performing data augmentation processing on the same image (original image) in Expression 4 is additionally included may be used.

[Math 26]

$$P(i) = \{p \in A(i) : \tilde{y}_p = \tilde{y}_i \lor p = t(i)\} \quad \text{(Expression 6)}$$

In this manner, first loss calculator 17 can calculate, using the changed first loss function, a contrastive loss when M image data items are different but are obtained by performing data augmentation processing on the same original image data. The following describes results of the first loss calculation shown by Expression 2, Expression 3, Expression 4, and Expression 6, using examples.

Figure 17C:
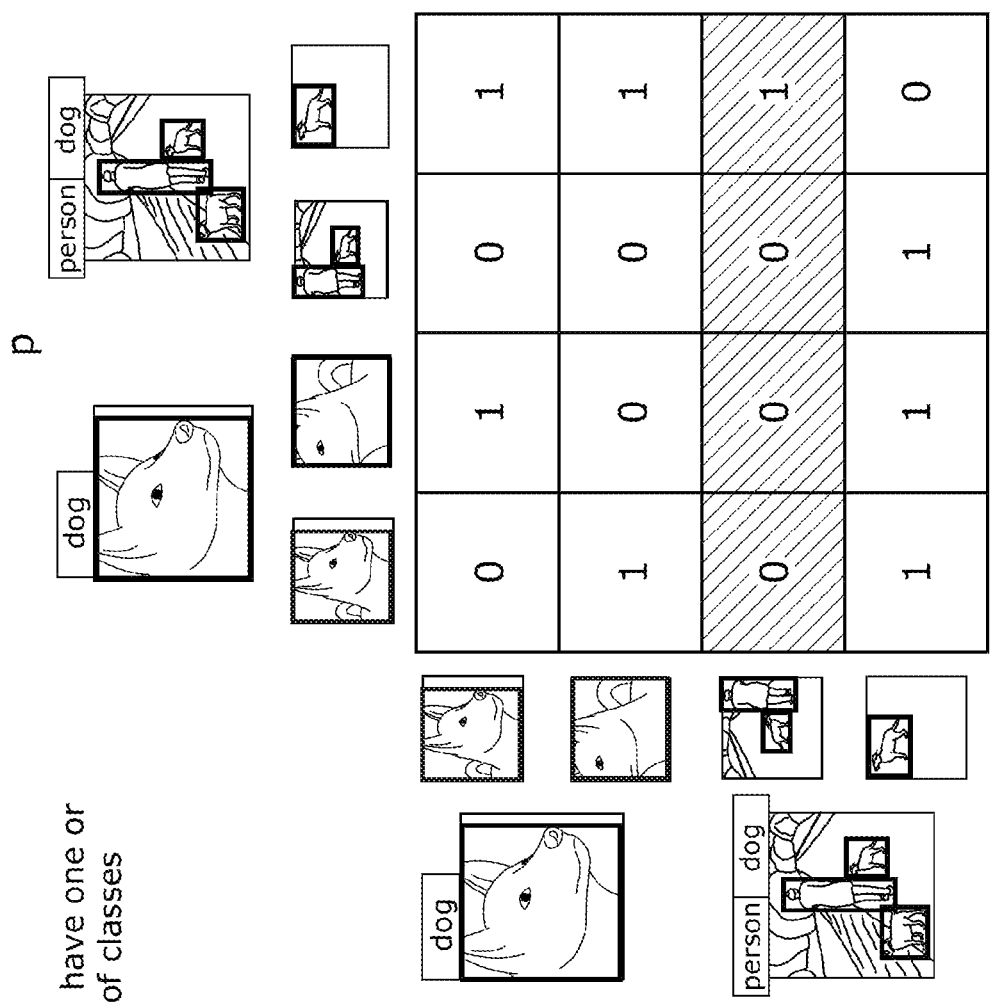
FIG. 17C illustrates examples of results of label processing when labels have one or more types of classes when the first loss function is changed, according to the embodiment.

FIG. 17C illustrates examples of results of label processing when labels have one or more types of classes when the first loss function is changed, according to the present embodiment. FIG. 17D conceptually illustrates the changed first loss calculation used to obtain results illustrated in FIG. 17C.

FIG. 17C also illustrates four images obtained by performing data augmentation processing on two original images. The original images and the four images illustrated in FIG. 17C are the same as those in FIG. 17A, and thus description thereof is omitted.

As described with reference to FIG. 17A, if an anchor image corresponding to a label whose class label has been reset by label processing is one image of an image pair, the result of calculating Expression 5 of the first loss function is 0. However, by calculating Expression 6 instead of Expression 5, at least one value of the image pair that includes images one of which is an anchor image associated with the reset label is 1. This is because as illustrated in FIG. 17D, results as shown in (c) of FIG. 17D can be obtained by adding elements in the table calculated by using $$A(i) \tilde{y}_p = \tilde{y}_i, \quad \text{[Math 27]}$$

which are shown in (a) of FIG. 17D, to the elements in the table calculated by using t(i)=p shown in (b) of FIG. 17D.

Note that the elements in the table calculated by using $$A(i) \tilde{y}_p = \tilde{y}_i, \quad \text{[Math 28]}$$

which are shown in (a) of FIG. 17D, are elements in the table shown in FIG. 17A. The elements in the table calculated by using t(i)=p, which are shown in (b) of FIG. 17D, each show the value of 1 if different images are obtained by performing data augmentation processing on the same image, that is, the same original image, but each show the value of 0 for a pair of same images even if the original image is the same.

In this manner, if different images are obtained by performing data augmentation processing on the same image, such images can be used in contrastive learning. Accordingly, this can reduce insufficiency of the number of data items included in a data set resulting from data augmentation by not utilizing all labels each including two or more correct answers, and can reduce instability of training in supervised contrastive learning, so that better accuracy can be achieved.

[1-6 Second Loss Calculator 18]

Second loss calculator 18 performs second loss calculation 181 for calculating a second loss function for use in training, from labels of inferred M image data items and labels of the M image data items.

Here, the second loss function is a cross entropy loss function, for example.

In the present embodiment, second loss calculator 18 performs second loss calculation 181 illustrated in FIG. 5. More specifically, second loss calculator 18 calculates a loss (error) between a label of at least one inferred image data item $$\tilde{x}_{t(i)} \quad \text{[Math 29]}$$

and a label $$\tilde{y}_{t(i)} \quad \text{[Math 30]}$$

of the at least one image data item, using the second loss function.

[1-7 Training Executor 19]

Training executor 19 trains encoder network model 13*a* and first model 14*a*, with use of the first loss function for use in supervised contrastive learning, labels of M image data items on which label processing has been performed, and embedding vectors of the M image data items. In the present embodiment, training executor 19 calculates a loss based on a vector similarity by using the first loss function when training encoder network model 13*a* and first model 14*a*.

Note that in the label processing, when a class label is reset, training executor 19 calculates a contrastive loss by using the first loss function when M image data items are different but are obtained by performing data augmentation processing on the same image data. Training executor 19 trains encoder network model 13*a* and first model 14*a* by calculating such a loss (error). In this manner, training executor 19 can train encoder network model 13*a* and first model 14*a* by contrastive learning, so that similar image data items are projected onto similar embedding vectors also in an embedding space and different image data items are projected onto different embedding vectors also in the embedding space.

Training executor 19 trains encoder network model 13*a* and second model 15*a*, using the second loss function for use in training, an inferred label of at least one image data item, and a label of the at least one image data item.

In the present embodiment, training executor 19 trains encoder network model 13*a* and first model 14*a* and simultaneously trains encoder network model 13a and second model 15a, by using the first loss function and the second loss function as a single loss function. For example, the first loss function and the second loss function can be used as a single loss function, by using a loss function obtained by adding up a result of multiplying the first loss function by a weight of an arbitrary real number to the second loss function, for example. In this manner, training executor 19 can cause encoder network model 13a to learn its variable by back propagation of losses obtained by weighting losses calculated by using the first loss function and the second loss function.

Note that training executor 19 can train encoder network model 13a, first model 14a, and second model 15a, by adopting various methods such as a steepest descent method.

[2 Operation of Training Device 1]

Training device 1 having a configuration as above simultaneously performs supervised contrastive learning processing and training processing. The following describes in detail supervised contrastive learning processing and training processing.

Figure 18:
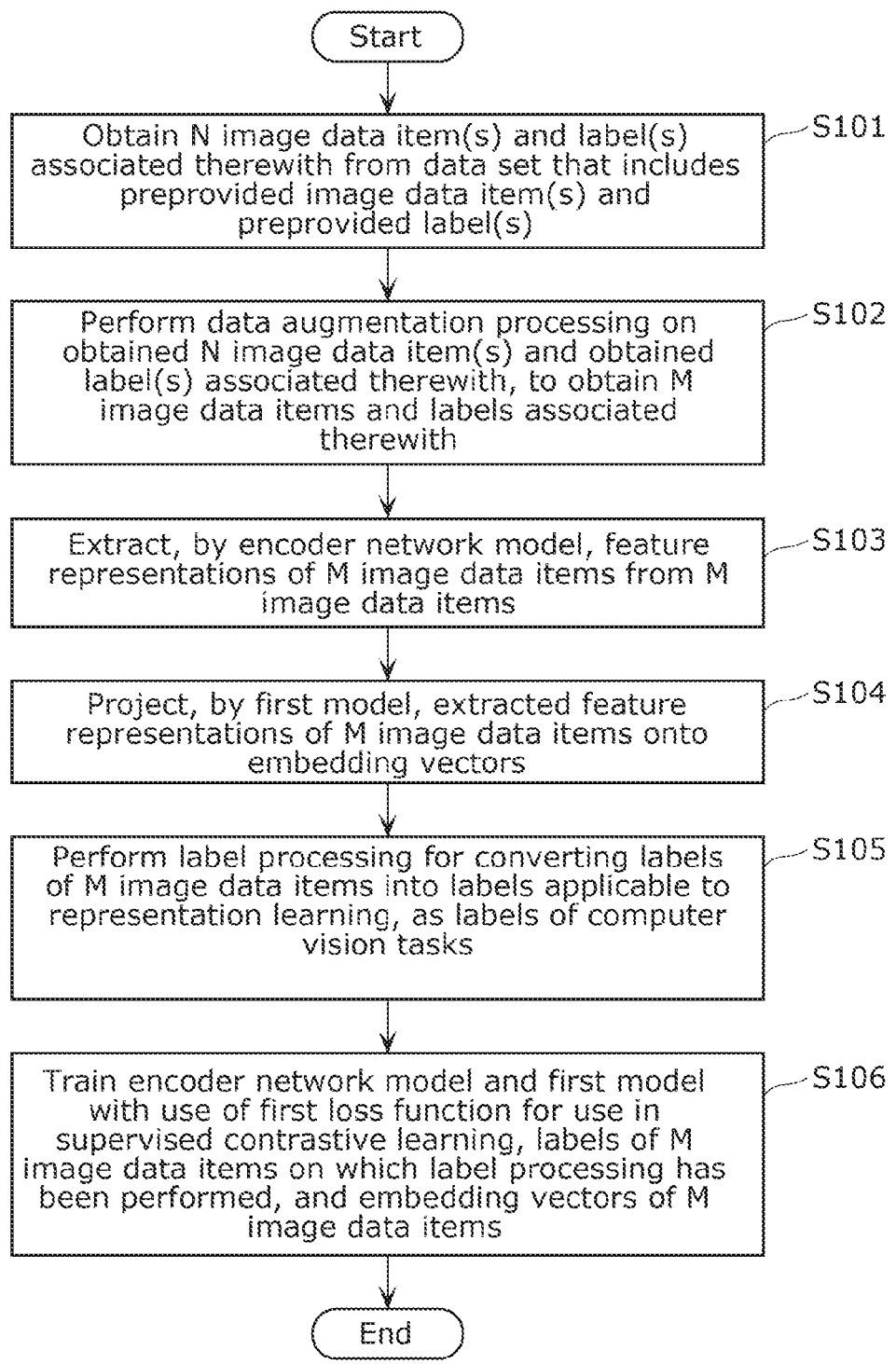
FIG. 18 is a flowchart showing in detail an example of supervised contrastive learning processing according to the embodiment.

FIG. 18 is a flowchart showing in detail an example of supervised contrastive learning processing according to the present embodiment.

As illustrated in FIG. 18, first, training device 1 obtains N image data that is one or more image data items and one or more labels in one-to-one association with the N image data from a data set that includes one or more preprovided image data items and one or more preprovided labels in one-to-one association with the one or more preprovided image data items, N denoting an integer greater than or equal to 1 (S101). Note that N means a batch size.

Next, training device 1 performs data augmentation processing on the N image data obtained in step S101 and the one or more labels obtained in step S101, which are in one-to-one association with the N image data, to obtain M image data items and labels in one-to-one association with the M image data items, M denoting an integer multiple of N (S102).

Next, in training device 1, the encoder network model extracts feature representations of the M image data items from the M image data items (S103).

Next, in training device 1, first model 14a projects the feature representations of the M image data items that are extracted in step S102 onto embedding vectors for use in the supervised contrastive learning (S104). First model 14a projects image feature representations output from encoder network model 13a onto an embedding space of an arbitrary vector dimension.

Next, training device 1 performs label processing for converting the labels of the M image data items into labels applicable to the representation learning, as labels of the computer vision tasks (S105). Here, for example, training device 1 performs label processing for converting labels of the M image data items into, for instance, one-hot representations in each of which a class dimension is used, the class dimension having a dimension count that is a class count of a class label used in the classification task.

Next, training device 1 trains encoder network model 13a and first model 14a, with use of the first loss function for use in supervised contrastive learning, the labels of the M image data items on which label processing has been performed, and the embedding vectors of the M image data items (S106).

In this manner, by performing the label processing in step S105, a label of a task other than the classification task can be converted into, for instance, a one-hot representation of a label of the classification task so as to be a label applicable to representation learning as a label of the computer vision tasks. In this manner, for example, supervised contrastive learning can be utilized in a task other than the classification task, such as an object detection task.

Figure 19:
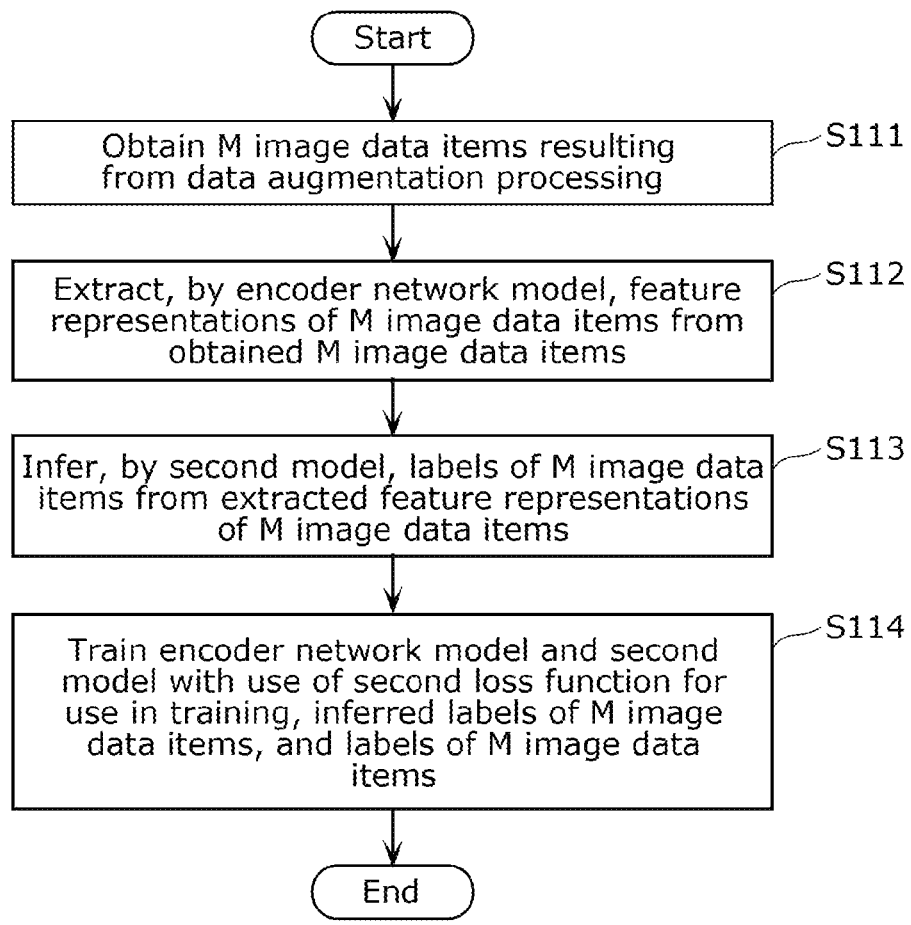
FIG. 19 is a flowchart showing in detail an example of training processing according to the embodiment.

FIG. 19 is a flowchart showing in detail an example of training processing according to the present embodiment.

As illustrated in FIG. 19, first, training device 1 obtains M image data items resulting from data augmentation processing (S111).

Next, in training device 1, encoder network model 13a trained by supervised contrastive learning extracts feature representations of the M image data items from the M image data items obtained in step S111 (S112).

Next, in training device 1, second model 15a infers, from the extracted feature representations of the M image data items, labels of the M image data items (S113).

Next, training device 1 trains encoder network model 13a and second model 15a, using the second loss function for use in the training, the inferred labels of the M image data items, and the labels of the M image data items (S114).

[3 Advantageous Effects and Others]

In the present embodiment, when performing representation learning in which supervised contrastive learning is utilized, a label of a task other than the classification task is converted into a one-hot representation of a label of the classification task so as to be a label applicable to representation learning as a label of the image representation technical filed task.

In this manner, supervised contrastive learning may be utilized in a task other than the classification task, such as an object detection task, for example.

Thus, there is a possibility that a training method applicable to training of a task of the computer vision tasks other than the classification task can be achieved.

In the above embodiment, for example, in the label processing, by (i) converting, as the labels of the computer vision tasks, the labels of the M image data items into applicable representations in which a value greater than or equal to 2 is allowed for a value of each of dimensions, and (ii) applying a step function that converts a value greater than β for each of the dimensions in the applicable representations into 1, the applicable representations being applicable to the representation learning, 13 denoting an arbitrary number, the labels of the M image data items are converted into the applicable representations in which the value for each of the dimensions is 0 or 1.

Accordingly, a label of a task other than the classification task can be utilized as label information in supervised contrastive learning. Stated differently, there is a possibility that in a training method for a neural network model, supervised representation learning in one stage can be applied to a task other than the classification task.

Here, for example, in the training of the encoder network model and the first model, when the M image data items include two different image data items that are obtained by performing the data augmentation processing on a same image data item, supervised contrastive loss is calculated by using the first loss function.

In this manner, there is a possibility that if different data items are obtained by performing data augmentation processing on the same image, such images can be used in contrastive learning. Accordingly, this can reduce insufficiency of the number of data items included in a data set resulting from data augmentation by not utilizing all labels each including two or more correct answers and instability of training in supervised contrastive learning, so that better accuracy can be achieved.

Here, for example, in the label processing, when the applicable representations resulting from converting the labels of the M image data items include a value of 1 for each of two or more of the dimensions, the value of 1 for each of the two or more of the dimensions is further converted into 0.

In this manner, if a label includes two or more correct answers, the label can be prevented from being utilized as label information in supervised contrastive learning. In this manner, there is a possibility that a processing load when such a label is utilized as label information in supervised contrastive learning can be reduced.

For example, in the training of the encoder network model and the first model, a loss based on a vector similarity is calculated by using the first loss function.

In this manner, there is a possibility that supervised contrastive learning can be executed, utilizing a contrastive loss with use of a vector similarity.

Variation

The above embodiment has described performing supervised contrastive learning with use of embedding vectors obtained by projecting vector feature representations of an image pair obtained by performing data augmentation processing, but the present application is not limited thereto.

From one of the embedding vectors resulting from projecting vector feature representations of an image pair, the other embedding vector may be predicted, and supervised contrastive learning may be performed using the predicted embedding vector and the other embedding vector. This case is to be described below as a variation.

Figure 20:
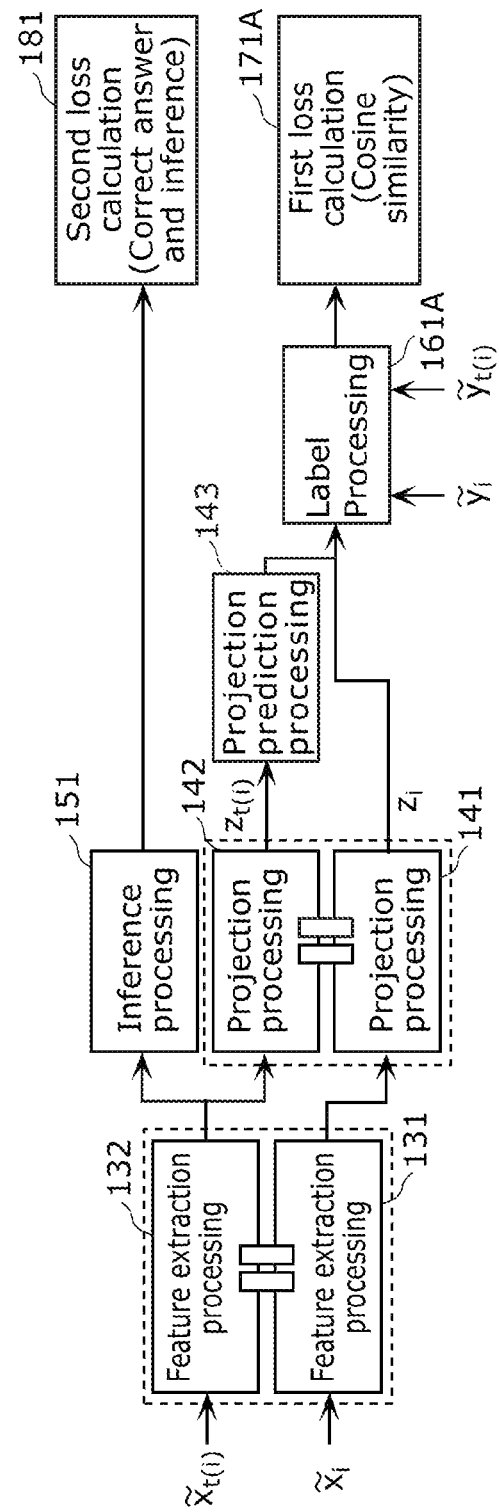
FIG. 20 is a diagram for conceptually explaining processing when a training method according to a variation is executed.

FIG. 20 is a diagram for conceptually explaining processing when a training method according to this variation is executed. Equivalent elements to those in FIG. 5 are given the same numerals, and detailed description thereof is omitted.

The processing illustrated in FIG. 20 additionally includes projection prediction processing 143, as compared with the processing illustrated in FIG. 5, and due to this, label processing 161A and first loss calculation 171A are different.

In projection prediction processing 143, an embedding vector obtained by projection processing 141 is predicted from an embedding vector obtained by projection processing 142, and the predicted embedding vector is output to label processor 16. Projection prediction processing 143 is performed using a third model different from encoder network model 13a, first model 14a, and second model 15a.

More specifically, the first network branch includes the third model in addition to encoder network model 13a and first model 14a, and is used to perform representation learning utilizing supervised contrastive learning.

In projection prediction processing 143, the third model is caused to output a third embedding vector obtained by predicting a second embedding vector from a first embedding vector, the first embedding vector being one of embedding vectors of two image data items that are output by the first model, the second embedding vector being a remaining one of the embedding vectors of the two image data items.

In projection prediction processing 143, training device 1 according to this variation predicts an embedding vector $$z_i \qquad \text{[Math 32]}$$

obtained by projection processing 141, from an embedding vector $$z_{t(i)} \qquad \text{[Math 31]}$$

obtained by projection processing 142, using the third model.

In label processing 161A, label processing is performed, which is for converting labels of two image data items into representations such as one-hot representations in each of which a class dimension is used, the class dimension having a dimension count that is a class count of a class label used in the classification task.

In this variation, in label processing 161A, an embedding vector $$e_{t(i)} \qquad \text{[Math 33]}$$

predicted in projection prediction processing 143 and an embedding vector $$z_i \qquad \text{[Math 34]}$$

obtained in projection processing 141 are obtained, and labels $$\tilde{y}_i, \tilde{y}_{t(i)} \qquad \text{[Math 35]}$$

of two image data items corresponding thereto are obtained. The other processing is similar to label processing 161 according to the above embodiment, and thus description thereof is omitted.

In first loss calculation 171A, a loss (error) may be calculated using the first loss function described in the above embodiment.

In this variation, the first loss function may be a loss function with which a loss can be calculated based on a cosine similarity having a smaller value if image data items belong to different classes and are separated in an embedding space while image data items belonging to the same class are brought close to each other in the embedding space. For the first loss function according to this variation, contrastive loss function $\mathcal{L}^{sup}$ with use of a cosine similarity (a negative cosine similarity) represented by Expression 7 below, for example, may be used.

[Math 36]

$$\mathcal{L}^{sup} = \sum_{i \in I} \frac{-1}{|P(i)|} \sum_{p \in P(i)} \frac{e_i}{\|e_i\|_2} \cdot \frac{z_p}{\|z_p\|_2} \qquad \text{(Expression 7)}$$

In this variation, training executor 19 trains encoder network model 13a, first model 14a, and the third model with use of the first loss function for use in supervised contrastive learning, labels of M image data items on which label processing has been performed, the second embedding vector, and the third embedding vector. Stated differently, training executor 19 according to this variation calculates a loss based on a cosine similarity by using the first loss function, when training encoder network model 13a, first model 14a, and the third model.

As described above, in this variation, projection prediction processing is further performed, and representation learning utilizing supervised contrastive learning is performed. Also in this variation, similarly to the embodiment above, label processing on a label is performed to convert a label of a task other than the classification task into a representation of a label of the classification task such as a one-hot representation.

As described above, in this variation, the first network branch: includes a third model; causes the third model to output a third embedding vector obtained by the third model predicting a second embedding vector from a first embedding vector, the first embedding vector being one of embedding vectors of two image data items that are output by the first model, the second embedding vector being a remaining one of the embedding vectors of the two image data items; performs the label processing for converting labels of the two image data items into one-hot representations in each of which a class dimension is used, the class dimension having a dimension count that is a class count of a class label used in the classification task; and trains the encoder network model, the first model, and the third model with use of the first loss function for use in the supervised contrastive learning, the labels of the two image data items on which the label processing has been performed, the second embedding vector, and the third embedding vector.

For example, in the training of the encoder network model, the first model, and the third model, a loss based on a cosine similarity may be calculated by using the first loss function.

Accordingly, there is a possibility that not only supervised contrastive learning can be utilized in a task other than the classification task, such as, for example, an object detection task, but also a calculation resource at that time can be reduced and a training time can be shortened. Thus, there is a possibility that as in this variation, by performing representation learning utilizing supervised contrastive learning, a large amount of calculation resources is no longer necessary, high accuracy can be achieved even if a batch size in training is small, and a training time can be shortened, and thus high accuracy can be achieved with a small number of epochs.

Other Embodiments

The above has described the training method according to the present disclosure based on embodiments, yet the present disclosure is not limited to such embodiments. The scope of the present disclosure also encompasses embodiments as a result of applying, to the embodiments, various modifications that may be conceived by those skilled in the art, and embodiments obtained by combining elements in different embodiments, as long as the resultant embodiments do not depart from the spirit of the present disclosure.

Further, the cases as below are also encompassed within the scope of one or more aspects of the present disclosure.

(1) One or more of the elements included in the training device that implements the above training method described above may be a computer system that includes a microprocessor, ROM, RAM, a hard disk unit, a display unit, a keyboard, and a mouse, for instance. A computer program is stored in the RAM or the hard disk unit. The operation of the microprocessor in accordance with the computer program achieves its functionality. Here, the computer program includes a combination of command codes indicating instructions to a computer in order to achieve given functionality.

(2) One or more of the elements included in the training device that implements the above training method may include a single system large scale integration (LSI: large scale integrated circuit). The system LSI is a super multi-functional LSI manufactured by integrating plural components into one chip, and is specifically a computer system configured so as to include a microprocessor, ROM, and RAM, for instance. A computer program is stored in the RAM. The system LSI accomplishes its functionality by the microprocessor operating in accordance with the computer program.

(3) One or more of the elements included in the training device that implements the above training method may be included in an IC card or a single module that can be attached to or detached from the devices. The IC card or the module is a computer system that includes a microprocessor, ROM, and RAM, for instance. The above super-multifunctional LSI may be included in the IC card or the module. The IC card or the module accomplishes its functionality by the microprocessor operating in accordance with the computer program. This IC card or module may have tamper resistant properties.

(4) One or more of the elements included in the training device that implements the above training method may be the above computer program or a digital signal stored in a computer-readable recording medium such as, for example, a flexible disk, a hard disk, CD-ROM, MO, DVD, DVD-ROM, DVD-RAM, Blu-ray (registered trademark) Disc (BD), or a semiconductor memory. Furthermore, such one or more of the elements may each be the above digital signal stored in such a recording medium.

For example, a computer program that implements the above training method is a program that causes a computer to execute a training method for training a neural network model that includes a first network branch for representation learning with use of supervised contrastive learning, and a second network branch for training of computer vision tasks that include a classification task and a task other than the classification task, the neural network model including: an encoder network model shared by the first network branch and the second network branch; a first model included in only the first network branch; and a second model included in only the second network branch, the training method including: obtaining N image data that is one or more image data items and one or more labels in one-to-one association with the N image data from a data set that includes one or more preprovided image data items and one or more preprovided labels, N denoting an integer greater than or equal to 1; performing data augmentation processing on the N image data and the one or more labels in one-to-one association with the N image data, to obtain M image data items and labels in one-to-one association with the M image data items, M denoting an integer multiple of N; extracting, by the encoder network model, feature representations of the M image data items from the M image data items; projecting, by the first model, the feature representations of the M image data items that are extracted, onto embedding vectors for use in the supervised contrastive learning; performing label processing for converting the labels of the M image data items into labels applicable to the representation learning, as labels of the computer vision tasks; training the encoder network model and the first model with use of a first loss function for use in the supervised contrastive learning, the labels of the M image data items on which the label processing has been performed, and the embedding vectors of the M image data items; obtaining the M image data items resulting from the data augmentation processing; extracting, by the encoder network model trained by the supervised contrastive learning, feature representations of the M image data items from the M image data items obtained; inferring, by the second model, labels of the M image data items from the feature representations of the M image data items that are extracted; and training the encoder network model and the second model with use of a second loss function for use in the training, the labels of the M image data items that are inferred, and the labels of the M image data items. The training of the encoder network model and the first model and the training of the encoder network model and the second model are simultaneously performed.

One or more of the elements included in the training device that implements the above training method may transmit the computer program or the digital signal via, for instance, electric telecommunication lines, wireless or wired communication lines, a network typified by and the Internet, or data broadcasting.

(5) The present disclosure may be a method described above. Further, the present disclosure may be a computer program that implements the method using a computer, or may be a digital signal that includes the computer program.

(6) Furthermore, the present disclosure may be a computer system that includes a microprocessor and memory, the memory may have stored therein the above computer program, and the microprocessor may operate in accordance with the computer program.

(7) Furthermore, the above program or the above digital signal may be executed by another independent computer system by being recorded on the above recording medium and transferred to the system, or by being transferred to the system via the above network, for instance.

(8) Further, operation of some of the elements included in the training device that implements the above training method may be performed in a cloud or a server device.

(9) The embodiments and the variations may be combined.

While various embodiments have been described herein above, it is to be appreciated that various changes in form and detail may be made without departing from the spirit and scope of the present disclosure as presently or hereafter claimed.

Further Information about Technical Background to this Application

The disclosure of the following patent application including specification, drawings, and claims is incorporated herein by reference in its entirety: Japanese Patent Application No. 2022-029757 filed on Feb. 28, 2022.

Industrial Applicability

The present disclosure is applicable to a training method for supervised contrastive learning, which is applicable to learning of a task other than a classification task using a data set of data items whose data counts vary for labels, and a program, for instance.

The invention claimed is:

1. A training method performed by a computer to train a neural network model that includes a first network branch for representation learning with use of supervised contrastive learning, and a second network branch for training of computer vision tasks that include a classification task and a task other than the classification task, the neural network model including: an encoder network model shared by the first network branch and the second network branch; a first model included in only the first network branch; and a second model included in only the second network branch, the training method comprising:

obtaining N image data that is one or more image data items and one or more labels in one-to-one association with the N image data from a data set that includes one or more preprovided image data items and one or more preprovided labels, N denoting an integer greater than or equal to 1;

performing data augmentation processing on the N image data obtained and the one or more labels obtained, which are in one-to-one association with the N image data, to obtain M image data items and labels in one-to-one association with the M image data items, M denoting an integer multiple of N;

extracting, by the encoder network model, feature representations of the M image data items from the M image data items;

projecting, by the first model, the feature representations of the M image data items that are extracted, onto embedding vectors for use in the supervised contrastive learning;

performing label processing for converting the labels of the M image data items into labels applicable to the representation learning, as labels of the computer vision tasks;

training the encoder network model and the first model with use of a first loss function for use in the supervised contrastive learning, the labels of the M image data items on which the label processing has been performed, and the embedding vectors of the M image data items;

obtaining the M image data items resulting from the data augmentation processing;

extracting, by the encoder network model, feature representations of the M image data items from the M image data items obtained;

inferring, by the second model, labels of the M image data items from the feature representations of the M image data items that are extracted; and training the encoder network model and the second model with use of a second loss function for use in the training, the labels of the M image data items that are inferred, and the labels of the M image data items, wherein the training of the encoder network model and the first model and the training of the encoder network model and the second model are simultaneously performed, and wherein in the label processing, by
  (i) converting, as the labels of the computer vision tasks, the labels of the M image data items into applicable representations in which a value greater than or equal to 2 is allowed for a value of each of dimensions, and
  (ii) applying a step function that converts a value greater than $\beta$ for each of the dimensions in the applicable representations into 1, the applicable representations being applicable to the representation learning, $\beta$ denoting an arbitrary number, the labels of the M image data items are converted into the applicable representations in which the value for each of the dimensions is 0 or 1.

2. The training method according to claim 1,
wherein in the training of the encoder network model and the first model, when the M image data items include two different image data items that are obtained by performing the data augmentation processing on a same image data item,
supervised contrastive loss is calculated by using the first loss function.

3. The training method according to claim 2,
wherein in the label processing, when the applicable representations resulting from converting the labels of the M image data items include a value of 1 for each of two or more of the dimensions,
the value of 1 for each of the two or more of the dimensions is further converted into 0.

4. The training method according to claim 1,
wherein in the training of the encoder network model and the first model, a loss based on a vector similarity is calculated by using the first loss function.

5. The training method according to claim 1,
wherein the first network branch:
- includes a third model;
- causes the third model to output a third embedding vector obtained by the third model predicting a second embedding vector from a first embedding vector, the first embedding vector being one of embedding vectors of two image data items that are output by the first model, the second embedding vector being a remaining one of the embedding vectors of the two image data items;
- performs the label processing for converting labels of the two image data items into one-hot representations in each of which a class dimension is used, the class dimension having a dimension count that is a class count of a class label used in the classification task; and
- trains the encoder network model, the first model, and the third model with use of the first loss function for use in the supervised contrastive learning, the labels of the two image data items on which the label processing has been performed, the second embedding vector, and the third embedding vector.

6. The training method according to claim 5,
wherein in the training of the encoder network model, the first model, and the third model,
a loss based on a cosine similarity is calculated by using the first loss function.

* * * * *